(12) United States Patent   (10) Patent No.: US 7,769,966 B2
Muro                             (45) Date of Patent:     Aug. 3, 2010

(54) APPARATUS AND METHOD FOR JUDGING VALIDITY OF TRANSFER DATA

(75) Inventor: Tomoharu Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 11/819,484

(22) Filed: Jun. 27, 2007

(65) Prior Publication Data

US 2008/0126669 A1    May 29, 2008

Related U.S. Application Data

(63) Continuation of application No. PCT/JP2004/019577, filed on Dec. 27, 2004.

(51) Int. Cl.
  *G06F 13/00* (2006.01)
  *H03M 13/00* (2006.01)
(52) U.S. Cl. ............... 711/154; 711/100; 714/758
(58) Field of Classification Search ............ 711/154
  See application file for complete search history.

(56) References Cited

U.S. PATENT DOCUMENTS

| 5,630,054 A |   | 5/1997  | Trang |
| 5,703,889 A | * | 12/1997 | Shimoda et al. ............. 714/809 |
| 5,887,197 A | * | 3/1999  | Isomura ........................ 710/55 |
| 6,986,095 B2 |  | 1/2006  | Maeda et al. |

FOREIGN PATENT DOCUMENTS

| JP | 5-35624      | 2/1993  |
| JP | 5-91072      | 4/1993  |
| JP | 5-260125     | 10/1993 |
| JP | 07-183887    | 7/1995  |
| JP | 11-045157    | 2/1999  |
| JP | 2001-144629  | 5/2001  |
| JP | 2002-183072 A| 6/2002  |

OTHER PUBLICATIONS

International Search Report of International Published Application No. PCT/JP2004/019577 (mailed Feb. 22, 2005).
"Japanese Office Action" mailed by JPO and corresponding to JP 2006-55051 on Feb. 9, 2010. Partial English Translation.

* cited by examiner

*Primary Examiner*—Mardochee Chery
(74) *Attorney, Agent, or Firm*—Fujitsu Patent Center

(57) ABSTRACT

A method of judging a validity of data included using a check code included in the data, generates a final computation result of the check code of 1 data block using data in a last frame of this data block. The final computation result is compared with the check code of the data block, and information instructing the processing of data having a specific group identifier to be skipped is set if an error in the data having the specific group identifier is detected before the comparing of the check code. If this information is set, the computation of the check code of the data having the specific group identifier is skipped.

6 Claims, 15 Drawing Sheets

APPARATUS AND METHOD FOR JUDGING VALIDITY OF TRANSFER DATA

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP/2004/019577 filed Dec. 27, 2004, in the Japanese Patent Office, the disclosure of which is hereby incorporated by reference.

BACKGROUND OF THE INVENTION

1. Field of the Invention

The present invention generally relates to apparatuses and methods for judging the validity of a transfer data that makes an error detection in data processing systems which need to make a high-speed and large-volume data transfer with a high reliability, and more particularly to an apparatus and a method for judging the validity of the transfer data using a check code in a data processing system in which a data block including the data and the check code with respect to the data is disassembled into a plurality of frames and transferred. The present invention also relates to a storage apparatus and a storage control apparatus that employ the apparatus or method described above, a computer-readable program for causing a computer to judge the validity of the transfer data by the method described above, and a computer-readable storage medium which stores such a computer-readable program.

2. Description of the Related Art

Recently, fiber channels are generally used as a means for making a high-speed and large-volume data transfer between a host computer and a storage apparatus. The storage apparatus includes a storage unit such as a disk unit (or disk drive) that is shared by a plurality of host computers, and a storage control apparatus that controls the data transfer between the host computer and the storage apparatus.

The data of the host computer at the sending end is disassembled into a plurality of frames of up to 2 kbytes and transferred on a fiber channel link, and is assembled back into the original data in the storage apparatus at the receiving end. Each of the frames that are transferred is error-protected by a Cyclic Redundancy Check (CRC), so that a highly reliable data transfer can be made.

However, there are demands to further improve the reliability of the data transfer, depending on the situation. In order to satisfy such demands, there is a protection method that protects the entire data prepared in the host computer, in addition to the error protection provided by the CRC for each frame. A computation according to a predetermined algorithm is carried out using the data to be protected, and a result obtained by this computation is used as the check code. The CRC code is one example of the check code. The CRC code or other check codes, such as cyclic codes, may be used depending on the situation.

According to the above protection method, a host computer adds a check code 102 to a user data 101, so as to obtain 1 data block 103 that is to be sent as shown in FIG. 1. FIG. 1 is a diagram showing the data protection by the check code. On the fiber channel link, the data block 103 is disassembled into a plurality of frames 104 (104a, 104b, 104c and 104c), and each frame 104 is protected by the CRC and transferred to the storage control apparatus. Normally, the check code 102 is smaller that the data amounting to 1 frame, and for this reason, the check code 102 is accommodated within the last frame 104 and transferred.

The storage apparatus carries out the CRC check for each of the received frames 104, and assembles the received frames 104 back into the original data block 103. Then, the storage apparatus carries out a computation with respect to the user data 101 according to the same algorithm that was used by the host computer to generate the check code 102. A result of this computation carried out in the storage apparatus should become the same as the check code 102 that is added by the host computer, and thus, by comparing the result of this computation and the check code 102, it is possible to judge the validity of the user data 101.

FIG. 2 is a diagram showing a structure of a data processing system employing the protection method described above. The data processing system shown in FIG. 2 includes one or more host computers 111, a communication network 112, a storage control apparatus 113, and one or more disk drives 114.

The host computer 111 is connected to the storage control apparatus 113 via the communication network 112, and the disk drive 114 is connected to the storage control apparatus 113. The storage control apparatus 113 and the disk drive 114 form a storage apparatus. The communication network 112 corresponds to the fiber channel link, for example, and is provided with a switch. Generally, a plurality of host computers 111 are connected to the communication network 112. The storage control apparatus 113 includes a processor 121, a controller 122 and a data buffer 123, and the controller 122 includes a check code judging circuit 131 and a CRC check circuit 132. The storage control apparatus 113 includes an interface (not shown) with respect to the host computer 111 and the disk drive 114, and receives the data from the host computer 111 via the communication network 112.

As shown in FIG. 1, the frame of the fiber channel includes a header part, a data part and a CRC code, and when the controller 122 receives the frame, the CRC check circuit 132 first confirms whether or not an error exists in the received frame. At the same time as this confirmation, the controller 122 stores the data part of the received frame in the data buffer 123, and delivers the header part to the processor 121. The header part of the frame includes information that is necessary to know the data block to which the frame belongs and to assemble the original data.

The storage control apparatus 113 repeats the operation described above, and successively receives the frames from the host computer 111. When the entire data block of one user is stored within the data buffer 123, the processor 121 starts the check code judging circuit 131.

The check code judging circuit 131 repeats an operation of reading the data block from the data buffer 123 a predetermined amount (for example, 4 bytes) at a time, and applying a predetermined algorithm to the read data, so as to generate the check code of the data block. Then, the check code judging circuit 131 judges the validity of the generated check code, and notifies a result of this judgement to the processor 121.

The applicant is aware of the following prior art references 1) through 6).

1) Japanese Laid-Open Patent Application No. 2001-144629
2) Japanese Laid-Open Patent Application No. 5-091072
3) Japanese Laid-Open Patent Application No. 5-035624
4) U.S. Pat. No. 5,630,054
5) Japanese Laid-Open Patent Application No. 5-260125
6) Japanese Laid-Open Patent Application No. 11-45157

The prior art reference 1) is related to an error correction apparatus for an optical disk, the prior art reference 2) is related to a data transfer system using CRC between terminals, the prior art reference 3) is related to a radio data transfer using an error correction code, and the prior art reference 4) is related to an error judgement of a storage apparatus using CRC. The prior art reference 5) is related to a data transfer control system for detecting a frame in which an error is generated during transfer and for resending the frame. The prior art reference 6) is related to a data transfer method for preventing considerable throughput deterioration and system halt caused by reissuance of a command when the CRC error is temporarily generated frequently during the data transfer.

The following problems are encountered in the conventional check code judging method described above.

According to the conventional check code judging sequence, the check code judging circuit is started to judge the check code after all of the frames of the data block of the user data are received. For this reason, it takes a considerably long time for the judgement to end. In order to end this judgement more quickly, it is conceivable to start the check code judging circuit every time the frame is received, and to compute the intermediate result up to the received data.

But on the fiber channel link, the frames of one user data are not necessarily transferred in succession, and as shown in FIG. 3, the user data from a plurality of host computers are disassembled into frames and transferred in an interleaved state. FIG. 3 is a diagram for explaining the data transfer from the plurality of host computers.

In the particular case shown in FIG. 3, the data blocks 141a, 141b and 141c (user data A, B and C) from the host computers 111a, 111b and 111c are respectively disassembled into 3 frames and transferred to the storage control apparatus 113. The original user data A, B and C are assembled from the data accommodated within these frames, and stored in the disk drive 114.

In this case, if the check code judging circuit is started every time the frame is received, the judgement of the check code with respect to 1 user data (for example, the user data A) can be ended quickly, but during this time, the remaining user data (for example, the user data B and C) cannot be input to the check code judging circuit. Consequently, the judgement with respect to the remaining user data must wait until the judgement with respect to the 1 user data ends, and this conceivable method does not sufficiently solve the problem of the judgement taking a considerably long time to end.

SUMMARY OF THE INVENTION

Accordingly, it is a general object of the present invention to provide a novel and useful apparatus and method for judging validity of transfer data, in which the problems described above are suppressed.

Another and more specific object of the present invention is to provide an apparatus and a method for judging validity of transfer data, a storage apparatus, a storage control apparatus, a computer-readable program and a computer-readable storage medium, which can reduce the time required to make the check code judgement that judges the validity of the transfer data in a data processing system in which data blocks of a plurality of user data are respectively disassembled into a plurality of frames and transferred.

Still another object of the present invention is to provide a judging apparatus for judging a validity of data included in each data block using a check code included in each data block, when a plurality of data blocks that are respectively disassembled into a plurality of frames are received by the judging apparatus, comprising a group identifier storing part configured to store a group identifier of a data block corresponding to a received frame, from among a plurality of group identifiers allocated to the plurality of data blocks; an intermediate result storing part having a plurality of entries respectively configured to store an intermediate computation result of a check code of the plurality of data blocks for each of the group identifiers; a generating part configured to generate an intermediate computation result of the check code using the data included in the received frame and the intermediate computation result stored in the entry of the intermediate result storing part corresponding to the group identifier stored in the group identifier storing part, and to update the intermediate computation result stored in the entry; a comparing part configured to compare a final computation result and the check code of one data block when the generating part generates the final computation result of the check code of the one data block using the data of a last frame of the one data block, and to output a comparison result; and a mask part configured to store information that instructs a processing of data having a specific group identifier to be skipped when an error of the data having the specific group identifier is detected before the comparing of the check code by the comparing part, wherein the mask part skips the computation of the check code of the data having the specific group identifier. According to the judging apparatus of the present invention, it is possible to carry out the check code judgement with respect to a plurality of user data in parallel by a single check code judging circuit, and the time required for the check code judgment can be reduced using a relatively small amount of hardware, and in addition, it is possible to quickly resume the processing of the data unrelated to an error when the error is detected, to thereby suppress delays or stagnation in the host computer.

A further object of the present invention is to provide a storage control apparatus for judging a validity of data included in each data block using a check code included in each data block, when a plurality of data blocks that are respectively disassembled into a plurality of frames are received by the storage control apparatus, comprising a receiving part configured to receive a frame; a control part configured to allocate a different group identifier to each of the plurality of data blocks, to interpret information in a header part of the received frame, and to allocate a group identifier of the data block corresponding to the received frame to the received frame; a group identifier storing part configured to store the group identifier allocated to the received frame; an intermediate result storing part having a plurality of entries respectively configured to store an intermediate computation result of a check code of the plurality of data blocks for each of the group identifiers; a generating part configured to generate an intermediate computation result of the check code using the data included in the received frame and the intermediate computation result stored in the entry of the intermediate result storing part corresponding to the group identifier stored in the group identifier storing part, and to update the intermediate computation result stored in the entry; a comparing part configured to compare a final computation result and the check code of one data block when the generating part generates the final computation result of the check code of the one data block using the data of a last frame of the one data block, and to output a comparison result; a judging part configured to judge an error in the data having a specific group identifier from the comparison result; and a mask part configured to store information that instructs a processing of data having the specific group identifier to be skipped when the error of the data having the specific group identifier is detected before the comparing of the check code by the comparing part, wherein the mask part skips the computation of the check code of the data having the specific group identifier and the judgement of the error by the judging part. According to the storage control apparatus of the present invention, it is possible to carry out the check code judgement with respect to a plurality of user data in parallel by a single check code judging circuit, and the time required for the check code judgment can be reduced using a relatively small amount of hardware, and in addition, it is possible to quickly resume the processing of the data unrelated to an error when the error is detected, to thereby suppress delays or stagnation in the host computer.

Another object of the present invention is to provide a storage apparatus for judging a validity of data included in each data block using a check code included in each data block and storing the data, when a plurality of data blocks that are respectively disassembled into a plurality of frames are received by the storage apparatus from a plurality of access apparatuses, comprising a receiving part configured to receive a frame; a control part configured to allocate a different group identifier to each of the plurality of data blocks, to interpret information in a header part of the received frame, and to allocate a group identifier of the data block corresponding to the received frame to the received frame; a group identifier storing part configured to store the group identifier allocated to the received frame; an intermediate result storing part having a plurality of entries respectively configured to store an intermediate computation result of a check code of the plurality of data blocks for each of the group identifiers; a generating part configured to generate an intermediate computation result of the check code using the data included in the received frame and the intermediate computation result stored in the entry of the intermediate result storing part corresponding to the group identifier stored in the group identifier storing part, and to update the intermediate computation result stored in the entry; a comparing part configured to compare a final computation result and the check code of one data block when the generating part generates the final computation result of the check code of the one data block using the data of a last frame of the one data block, and to output a comparison result; a judging part configured to judge an error in the data having a specific group identifier from the comparison result; a mask part configured to store information that instructs a processing of data having the specific group identifier to be skipped when the error of the data having the specific group identifier is detected before the comparing of the check code by the comparing part; and a storage unit shared by the plurality of access apparatuses, and configured to store an original data assembled from the data included in the plurality of frames of each data block, wherein the mask part skips the computation of the check code of the data having the specific group identifier and the judgement of the error by the judging part. According to the storage apparatus of the present invention, it is possible to carry out the check code judgement with respect to a plurality of user data in parallel by a single check code judging circuit, and the time required for the check code judgment can be reduced using a relatively small amount of hardware, and in addition, it is possible to quickly resume the processing of the data unrelated to an error when the error is detected, to thereby suppress delays or stagnation in the host computer.

Still another object of the present invention is to provide a computer-readable storage medium which stores a program for causing a computer to judge a validity of data included in each data block using a check code included in each data block and storing the data, when a plurality of data blocks that are respectively disassembled into a plurality of frames are received by the computer, the program comprising a procedure causing the computer to store a header part of a received frame in a storage part, to interpret information in the header part, and to judge whether or not the received frame is a first frame of one data block; a procedure causing the computer to allocate a new group identifier to the received frame if the received frame is the first frame, and to allocate a group identifier that is the same as that of a frame which has already been received and belongs to the same data block as the received frame if the received frame is not the first frame; a procedure causing the computer to compute a check code of each data block while holding an intermediate computation result of the check code of the plurality of data blocks for each of the group identifiers, and to transfer the allocated group identifier to a judging unit which compares the computed check code and the received check code; a procedure causing the computer to confirm the validity of each data block based on a comparison result of the check code transferred from the judging unit; a procedure causing the computer to set to the judging unit information that instructs a processing of data having a specific group identifier to be skipped when an error of the data having the specific group identifier is detected before the comparing of the check code; and a procedure causing the computer to skip the computation of the check code and the confirmation of the validity of the data having the specific group identifier. According to the computer-readable storage medium of the present invention, it is possible to carry out the check code judgement with respect to a plurality of user data in parallel by a single check code judging circuit, and the time required for the check code judgment can be reduced using a relatively small amount of hardware, and in addition, it is possible to quickly resume the processing of the data unrelated to an error when the error is detected, to thereby suppress delays or stagnation in the host computer.

A further object of the present invention is to provide a judging method for judging a validity of data included in each data block using a check code included in each data block when a plurality of data blocks are respectively disassembled into a plurality of frames and sent, the judging method comprising, every time one frame is received interpreting information in a header part of the received frame, and allocating a group identifier of the data block corresponding to the received frame to the received frame; storing the group identifier allocated to the received frame in a group identifier storing part; obtaining, from an intermediate result storing part having a plurality of entries respectively configured to store an intermediate computation result of a check code of the plurality of data blocks for each of the group identifiers, an intermediate computation result stored in an entry corresponding to the group identifier stored in the group identifier storing part; repeating an operation of generating an intermediate computation result of the check code using the data included in the received frame and the intermediate computation result stored in the entry of the intermediate result storing part corresponding to the group identifier stored in the group identifier storing part, and updating the intermediate computation result stored in the entry; comparing a final computation result and the check code of one data block when the final computation result of the check code of the one data block is generated using the data of a last frame of the one data block; setting information that instructs a processing of data having a specific group identifier to be skipped when an error of the data having the specific group identifier is detected before the comparing of the check code, wherein the computation of the check code of the data having the specific group identifier is skipped when the information instructing the processing of data to be skipped is set. According to the judging method of the present invention, it is possible to carry out the check code judgement with respect to a plurality of user data in parallel by a single check code judging circuit, and the time required for the check code judgment can be reduced using a relatively small amount of hardware, and in addition, it is possible to quickly resume the processing of the data unrelated to an error when the error is detected, to thereby suppress delays or stagnation in the host computer.

Another object of the present invention is to provide a carrier signal for carrying a program for causing a computer to judge a validity of data included in each data block using a check code included in each data block, when a plurality of data blocks that are respectively disassembled into a plurality of frames are received by the computer, the program comprising a procedure causing the computer to store a header part of a received frame in a storage part, to interpret information in the header part, and to judge whether or not the received frame is a first frame of one data block; a procedure causing the computer to allocate a new group identifier to the received frame if the received frame is the first frame, and to allocate a group identifier that is the same as that of a frame which has already been received and belongs to the same data block as the received frame if the received frame is not the first frame; a procedure causing the computer to compute a check code of each data block while holding an intermediate computation result of the check code of the plurality of data blocks for each of the group identifiers, and to transfer the allocated group identifier to a judging unit which compares the computed check code and the received check code; a procedure causing the computer to confirm the validity of each data block based on a comparison result of the check code transferred from the judging unit; a procedure causing the computer to set to the judging unit information that instructs a processing of data having a specific group identifier to be skipped when an error of the data having the specific group identifier is detected before the comparing of the check code; and a procedure causing the computer to skip the computation of the check code and the confirmation of the validity of the data having the specific group identifier. According to the carrier signal of the present invention, it is possible to carry out the check code judgement with respect to a plurality of user data in parallel by a single check code judging circuit, and the time required for the check code judgment can be reduced using a relatively small amount of hardware, and in addition, it is possible to quickly resume the processing of the data unrelated to an error when the error is detected, to thereby suppress delays or stagnation in the host computer.

Other objects and further features of the present invention will be apparent from the following detailed description when read in conjunction with the accompanying drawings.

DESCRIPTION OF THE PREFERRED EMBODIMENTS

Figure 4:
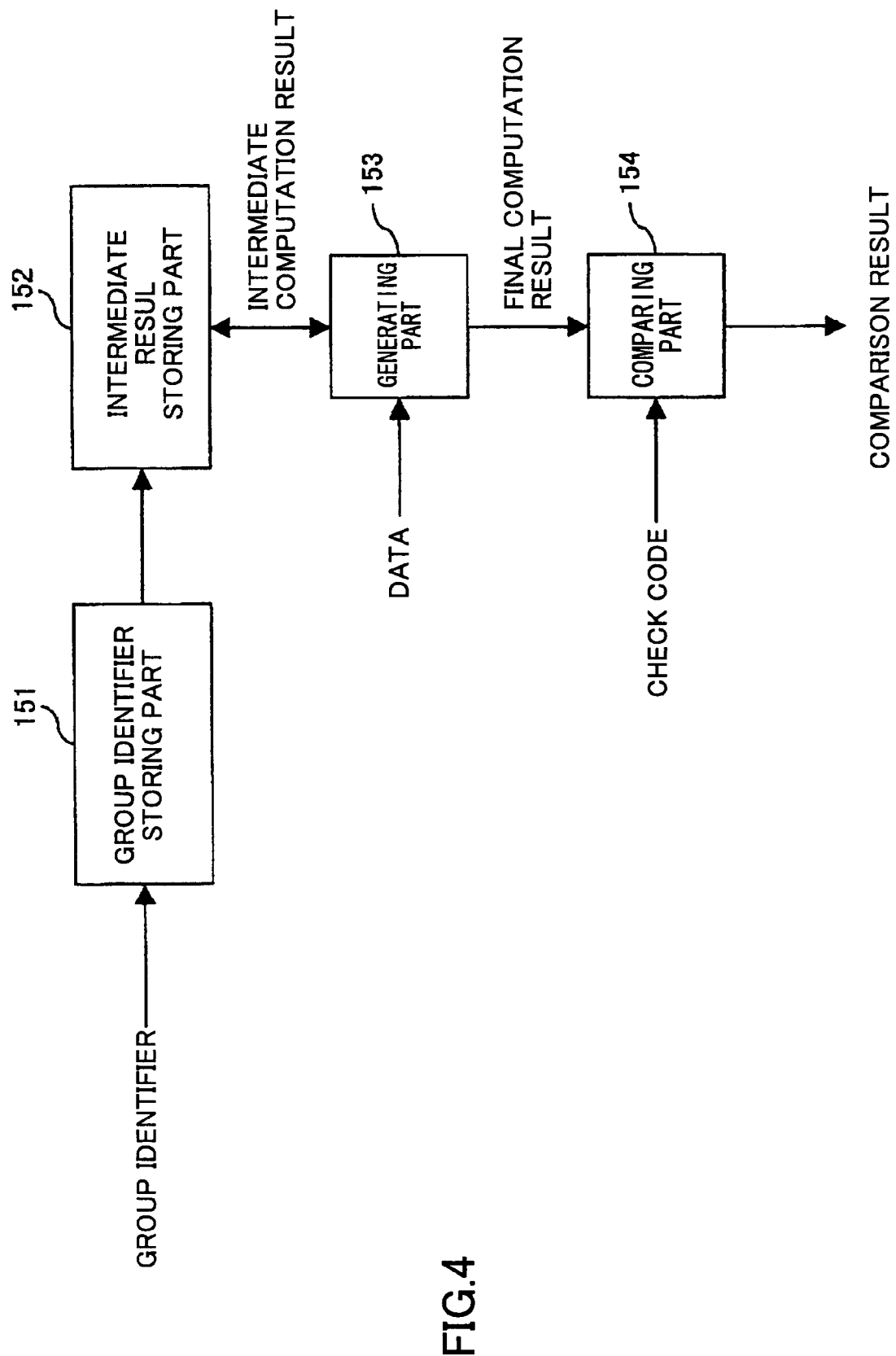
FIG. 4 is a diagram for explaining the operating principle of a judging apparatus according to the present invention.

A description will given of embodiments of the apparatus and method for judging validity of transfer data, the storage apparatus, the storage control apparatus, computer-readable program and computer-readable storage medium according to the present invention, by referring to FIG. 4 and the subsequent drawings.

FIG. 4 is a diagram for explaining the operating principle of a judging apparatus according to the present invention. A judging apparatus according to a first aspect of the present invention shown in FIG. 4 includes a group identifier storing part (or means) 151, an intermediate result storing part (or means) 152, a generating part (or means) 153, and a comparing part (or means) 154. When each of a plurality of data blocks is disassembled into a plurality of frames and sent, the judging apparatus uses the check code included in each data block to judge the validity of the data included in each data block.

The group identifier storing part 151 stores the group identifier of the data block corresponding to the received frame, from among the plurality of group identifiers allocated to the plurality of data blocks. The intermediate result storing part 152 has a plurality of entries respectively for storing the intermediate computation result of the check code of the data blocks for each of the group identifiers.

The generating part 153 generates the intermediate computation result of the check code, using the intermediate computation result stored in the entry of the intermediate result storing part 152 and the data included in the received frame, and updates the intermediate computation result stored in the entry.

When the generating part 153 generates the final computation result of the check code of the data block using the data of the last frame of 1 data block, the comparing part 154 compares this final computation result and the check code of the data block so as to output a comparison result.

Every time 1 frame is received, the group identifier of the data block corresponding to the received frame is stored in the group identifier storing part 151, and the intermediate computation result stored in the entry corresponding to the group identifier stored in the group identifier storing part 151 is obtained from the intermediate result storing part 152. The generating part 153 generates the intermediate computation result of the check code using the obtained intermediate computation result and the data included in the received frame, and updates the intermediate computation result that is stored in the entry.

The operation described above is repeated for every frame of the plurality of data blocks, and the intermediate computation results in the plurality of entries of the intermediate result storing part 152 are updated in parallel. When the last frame of 1 data block is received, the generating part 153 generates the final computation result of the check code using the data of this last frame, and the comparing part 154 outputs the comparison result by comparing the final computation result and the received check code. Hence, the final computation result of the check code is generated successively from the data block for which the last frame is received, and the comparison result is output. According to this judging apparatus, the check codes of the plurality of data blocks are updated in parallel, and when the last frame is received, the check result of the data block for which the last frame is received is obtained immediately. Therefore, the check code judgement of the plurality of user data can be made within a short time.

For example, the judging apparatus according to this first aspect of the present invention, the group identifier storing part 151, the intermediate result storing part 152, the generating part 153 and the comparing part 154 respectively correspond to a check code judging circuit 214, a group ID register 221, an intermediate result buffer 226, a check code generating circuit 229 and a check code comparing circuit 231 shown in FIG. 5 which will be described later.

In the present invention, when the plurality of data blocks are respectively disassembled into the plurality of frames and sent, the processor judges the validity of the data included in each data block using the check code included in each data block. A judging apparatus according to a second aspect of the present invention may compute the check code of each of the data blocks while holding the intermediate computation result of the check code of the data blocks for each of the group identifiers, and compare the computed check code and the received check code.

In this case, the processor store the information of the header part of the received frame in a storing part (or means), interprets this information, and judges whether or not the frame is the first frame of 1 data block. If the received frame is the first frame of 1 data block, a new group identifier is allocated to this received frame, and the allocated group identifier is transferred to the judging apparatus. On the other hand, if the received frame is not the first frame, a group identifier that is the same as that of another received frame belonging to the same data block as the received frame is allocated to this received frame, and the allocated group identifier is transferred to the judging apparatus. The validity of each data block is confirmed based on the comparison result of the check code transferred from the judging apparatus.

Because the processor carries out the process described above, the check codes of the plurality of data blocks are updated in parallel in the judging circuit, and the check code judgement of the plurality of user data can be carried out within a short time.

Figure 5:
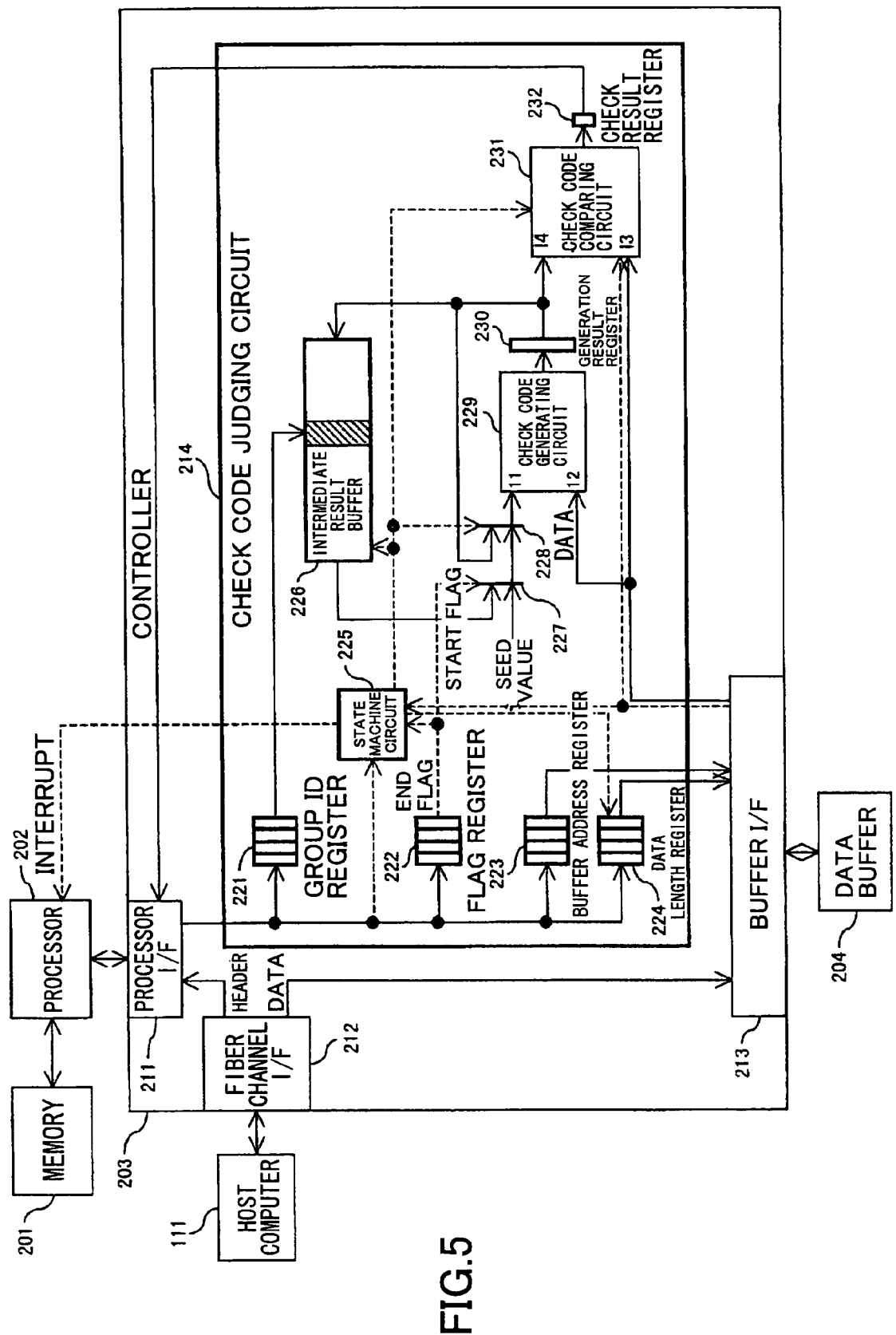
FIG. 5 is a diagram showing a structure of a first embodiment of a storage control apparatus according to the present invention.

For example, the judging apparatus and the storing part according to the second aspect of the present invention respectively correspond to the check code judging circuit 214 and a memory 201 shown in FIG. 5.

First Embodiment

FIG. 5 is a diagram showing a structure of a first embodiment of the storage control apparatus according to the present invention. In FIG. 5, a solid line arrow between blocks indicate a transfer of a data signal, and a broken line arrow between the blocks indicates a transfer of a control signal.

Figure 15:
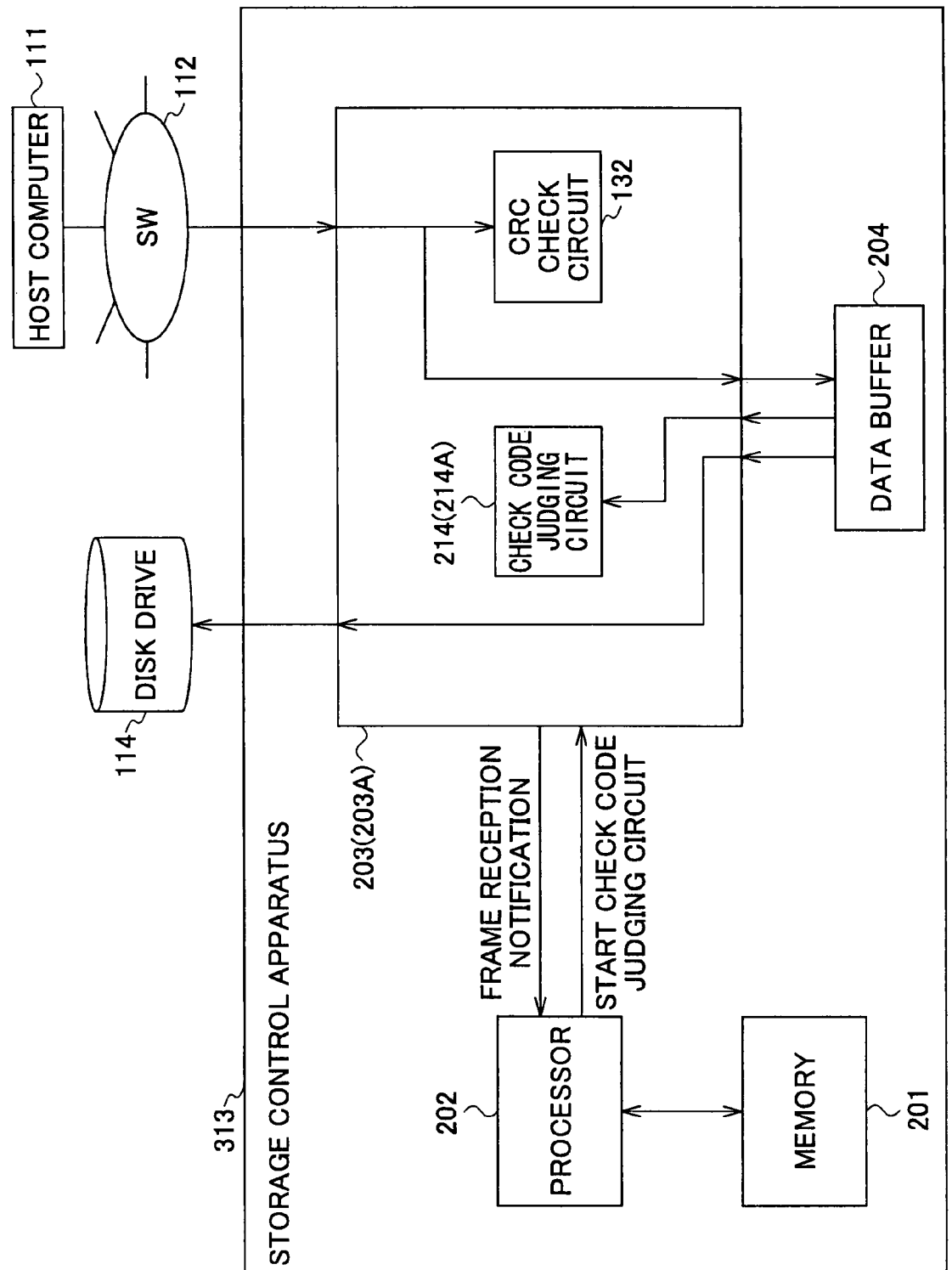
FIG. 15 is a diagram showing a structure of a data processing system.

The storage control apparatus shown in FIG. 5 includes the memory 201, a processor 202, a controller 203 and a data buffer 204. The controller 203 includes a processor interface (I/F) 211, a fiber channel interface (I/F) 212, a buffer interface (I/F) 213, and the check code judging circuit 214. In FIG. 5, the illustration of the CRC check circuit within the controller 203 and the disk drive connected to the storage control apparatus is omitted. As shown in FIG. 15 which will be described later, the storage apparatus is formed by the storage control apparatus and the disk drive.

The controller 203 is connected to the processor 202 via the processor interface 211, connected to the host computer 111 via the fiber channel interface 212, and connected to the data buffer 204 via the buffer interface 213. When the frame is received from the host computer 111, the data part is stored in the data buffer 204, and the header part and the address of the data buffer 204 storing the data are transferred to the processor 202.

The memory 201 includes a Random Access Memory (RAM) or the like, for example, and stores the programs and data used by the processor 202. The processor 202 executes a program using the memory 201, and carries out the following process.

The processor 202 interprets the header part received from the controller 203, and judges the portion of the data block where the received frame is located and the length of the data. If it is judged that the received frame is the first frame of a certain data block, a new group identifier (or group ID) is allocated with respect to the received frame. On the other hand, if it is judged that the received frame is not the first frame of a certain data block, a group identifier (or group ID) that is the same as that of another received frame belonging to the same data block as the received frame is allocated to this received frame.

Thereafter, the processor 202 starts the check code judging circuit 214 in order to judge the check code of the received frame. In this state, the following information required for the check code judgement is transferred to the controller 203.

The address where the data of the received frame is stored in the data buffer 204;

The data length of the data input to the check code judging circuit 214;

Flags indicating the beginning and the end of the user data; and

The group ID indicating the data block to which the data of the received frame belongs.

The check code judging circuit 214 includes a group ID register 221, a flag register 222, a buffer address register 223, a data length register 224, a state machine circuit 225, an intermediate result buffer 226, multiplexers 227 and 228, a check code generating circuit 229, a generation result register 230, a check code comparing circuit 231, and a check result register 232.

The group ID register 221, the flag register 222, the buffer address register 223, and the data length register 224 respectively store the group ID, the flag, the address of the data, and the data lengths that are transferred from the processor 202.

The check code generating circuit 229 computes the check code from an initial value of a predetermined length and the data of an arbitrary length, based on a predetermined algorithm. The generation result register 230 stores the computation result that is output from the check code generating circuit 229. The intermediate result buffer 226 stores the intermediate computation result of the check code for each group ID. The multiplexers 227 and 228 as a whole selectively outputs one of a predetermined seed value, the entry of the intermediate result buffer 226 and the output of the generation result register 230, as an initial value input for the check code generating circuit 229.

The check code comparing circuit 231 judges whether or not the computed check code and the check code stored in the data buffer 204 match, and the check result register 232 stores the judgement result that is output from the check code comparing circuit 231. This judgement result is transferred to the processor 202 via the processor interface 211. The state machine circuit 225 is started by an instruction from the processor 202, and controls the entire operation of the check code judging circuit 214.

The processor 202 notifies the group ID of each frame to the check code judging circuit 214. The check code judging circuit 214 stores the intermediate computation result of the check code to the intermediate result buffer 226 for each group ID, and uses the stored intermediate computation result as the initial value when continuing the computation. By carrying out such an operation, even if the plurality of user data that are respectively disassembled into a plurality of frames are received in a mixed state, it is possible to execute the check code judgement of the plurality of user data in parallel every time the frame is received. As a result, it is possible to reduce the time required to make the check code judgement.

The check code judging circuit 214 reads the first word of the data from the address of the data buffer 204 stored in the buffer address register 223, and inputs the first word to a port I2 of the check code generating circuit 229 at the same time as the initial value for the check code generation is input to a port I1 of the check code generating circuit 229.

The predetermined seed value is used as the initial value to the check code generating circuit 229 if the received frame is the first frame of the data block, and the value of the entry of the intermediate result buffer 226 corresponding to the group ID of the group ID register 221 is used as the initial value to the check code generating circuit 229 if the received frame is not the first frame of the data block. The portion of the data block where the received frame is located may be judged using the flag of the flag register 222.

The check code generating circuit 229 outputs the computation result of the check code to the generation result register 230. The check code judging circuit 214 then reads the second word of the data from the address of the data buffer 204 stored in the buffer address register 223, and inputs the second word to the port I2 of the check code generating circuit 229 at the same time as the output value of the generation result register 230 is input to the port I1 of the check code generating circuit 229. Such an operation is repeated for the length of the data instructed by the processor 202.

The check code judging circuit 214 reads the check code received from the data buffer 204 if the received frame is the last frame of the data block. Then, the check code comparing circuit 231 compares the read check code and the computation result of the check code finally generated by the check code generating circuit 229 by the sequence described above. If the two compared check codes match, it is possible to confirm the validity of the received data block.

If the received frame is not the last frame of the data block, the check code generating circuit 229 stores the intermediate computation result of the check code generated by the check code generating circuit 229 in the entry of the intermediate result buffer 226 corresponding to the group ID of the group ID register 221.

Figure 6:
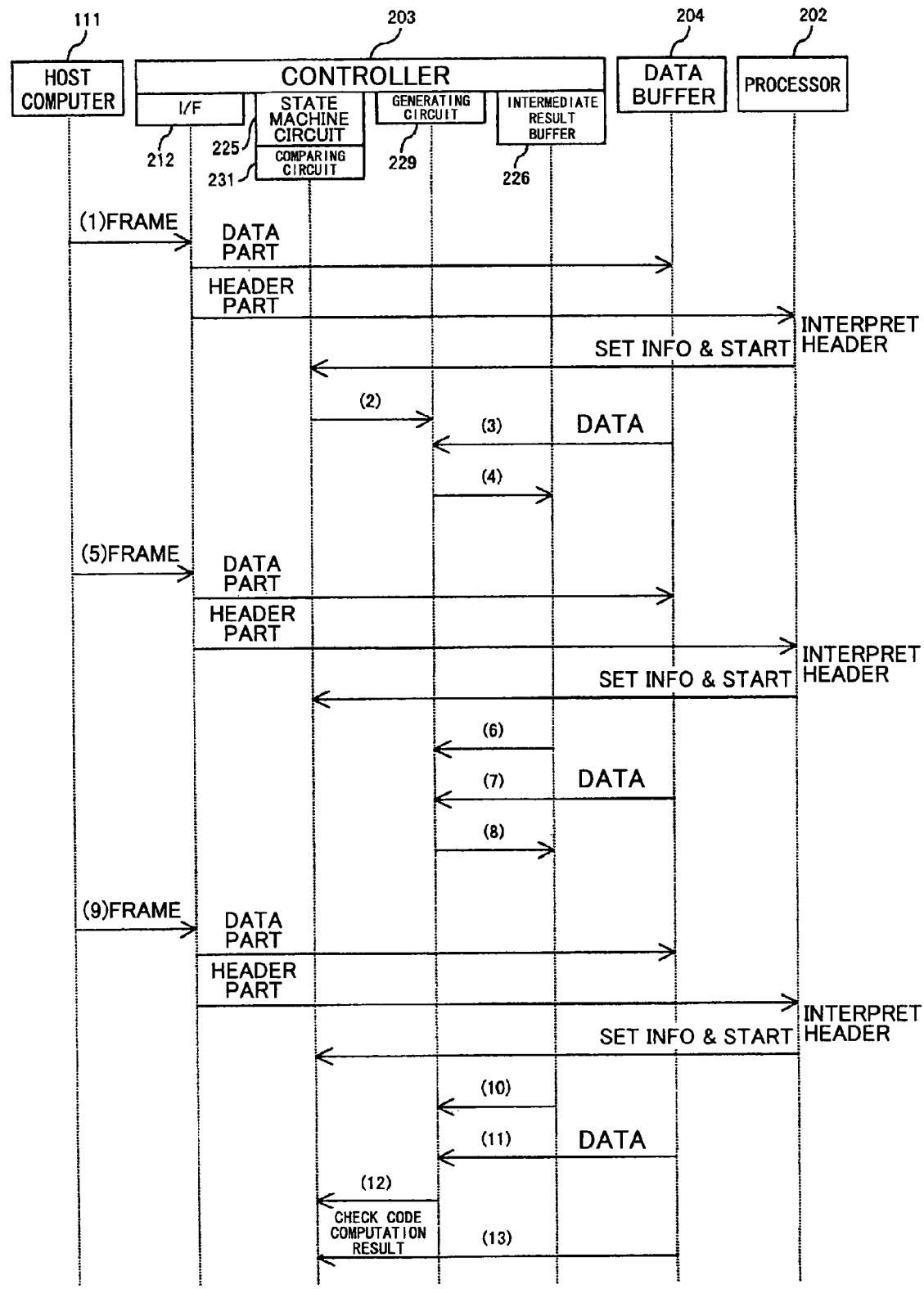
FIG. 6 is a diagram showing an operation sequence of the storage control apparatus.

FIG. 6 is a diagram showing an operation sequence of the storage control apparatus shown in FIG. 5. In the particular case shown in FIG. 6, 1 data block is disassembled into 3 frames and transferred from the host computer 111. The processor 202 interprets the header part of these 3 frames, and judges that the 3 frames are constituent elements of the same data block. Hence, the processor 202 allocates the same group ID to the 3 frames. The operation sequence shown in FIG. 6 includes the following steps of processes (1) through (13).

(1) In succession to the reception of the first frame, the state machine circuit 225 of the check code judging circuit 214 is started from the processor 202.

(2) The state machine circuit 225 sends the predetermined seed value, as the initial value, to the check code generating circuit 229.

(3) The check code generating circuit 229 computes the check code of the data read from the data buffer 204.

(4) After computing the instructed data, the check code generating circuit 229 stores the computation result to the entry of the intermediate result buffer 226 corresponding to the group ID.

(5) In succession to the reception of the second frame, the state machine circuit 225 is started from the processor 202.

(6) The state machine circuit 225 sends the value read from the entry of the intermediate result buffer 226 corresponding to the group ID, as the initial value, to the check code generating circuit 229.

(7) The check code generating circuit 229 computes the check code of the data read from the data buffer 204.

(8) After computing the instructed data, the check code generating circuit 229 stores the computation result to the entry of the intermediate result buffer 226 corresponding to the group ID.

(9) In succession to the reception of the third frame, the state machine circuit 225 is started from the processor 202.

(10) The state machine circuit 225 sends the value read from the entry of the intermediate result buffer 226 corresponding to the group ID, as the initial value, to the check code generating circuit 229.

(11) The check code generating circuit 229 computes the check code of the data read from the data buffer 204.

(12) After computing the instructed data, the check code generating circuit 229 outputs the computation result to the check code comparing circuit 231.

(13) The check code comparing circuit 231 reads the check code from the data buffer 204, and compares the read check code and the computed check code.

Next, a more detailed description will be given of the operation of the storage control apparatus shown in FIG. 5, by referring to FIGS. 7 through 10.

Figure 7:
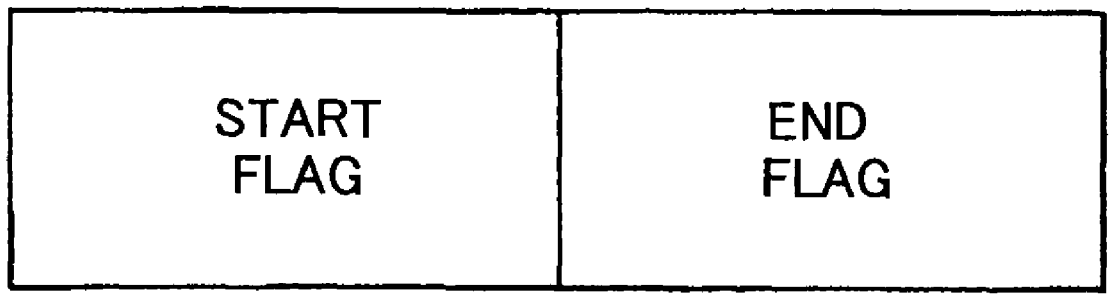
FIG. 7 is a diagram for explaining flags stored in a flag register.

FIG. 7 is a diagram for explaining a start flag and an end flag stored in the flag register 222. Each of the start flag and the end flag is represented by 1-bit information. The start flag indicates that the frame is the first frame of the data block when set (that is, has the logic value "1"). The end flag indicates that the frame is the last frame of the data block when set (that is, has the logic value "1"). Each of the start flag and the end flag indicates that the frame is an intermediate frame, other than the first and last frames, when reset (that is, has the logic value "0"). When both the start flag and the end flag are set (that is, have the logic value "1"), it is indicated that the frame is both the first and the last frame.

The multiplexer 227 selects the data output from the entry of the intermediate result buffer 226 corresponding to the group ID of the group ID register 221, when the start flag of the flag register 222 has the logic value "0", and selects the seed value when the start flag has the logic value "1". The data selected by the multiplexer 227 is output to the multiplexer 228.

Figure 8:
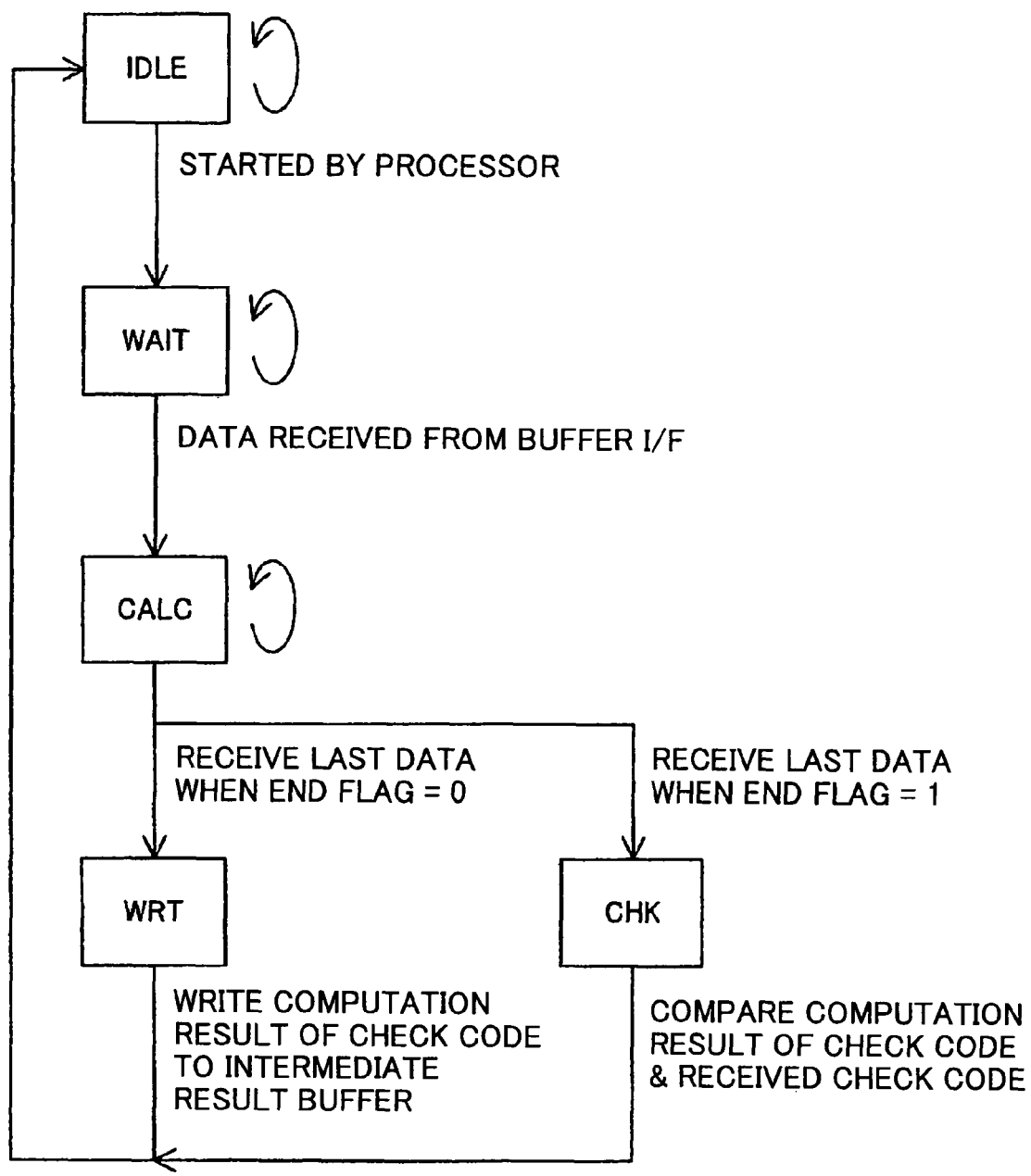
FIG. 8 is a diagram showing state transitions of a state machine circuit.

FIG. 8 is a diagram showing state transitions of the state machine circuit 225. The state machine circuit 225 makes a transition from an idle state IDLE to a wait state WAIT when started by the processor 202, and makes a transition from the wait state to a computation (or calculation) state CALC when the check code generating circuit 214 receives the data from the buffer interface 213. Then, the control necessary for the computation of the check code is started.

In the wait state WAIT, the state machine circuit 225 outputs a control signal which causes the multiplexer 228 to select the output of the multiplexer 227. In the computation state CALC, the state machine circuit 225 outputs a control signal which causes the multiplexer 228 to select the output of the generation result register 230.

In the computation state CALC, when the last word of the frame from the buffer interface 213 is received when the end flag in the flag register 222 has the logic value "0", the state machine circuit 225 makes a transition to a write state WRT. Then, the state machine circuit 225 outputs a write valid signal with respect to the intermediate result buffer 226, and carries out a control to write the computation result in the generation result register 230 to the intermediate result buffer 226.

Furthermore, in the calculation state CALC, when the last word of the frame is received when the end flag in the flag register 222 has the logic level "1", the state machine circuit 225 makes a transition to a check state CHK. Then, the state machine circuit 225 carries out a control to compare the computation result and the received check code. After the control in the write state WRT or the check state CHK ends, the state machine circuit 225 makes a transition to the idle state IDLE.

Figure 9:
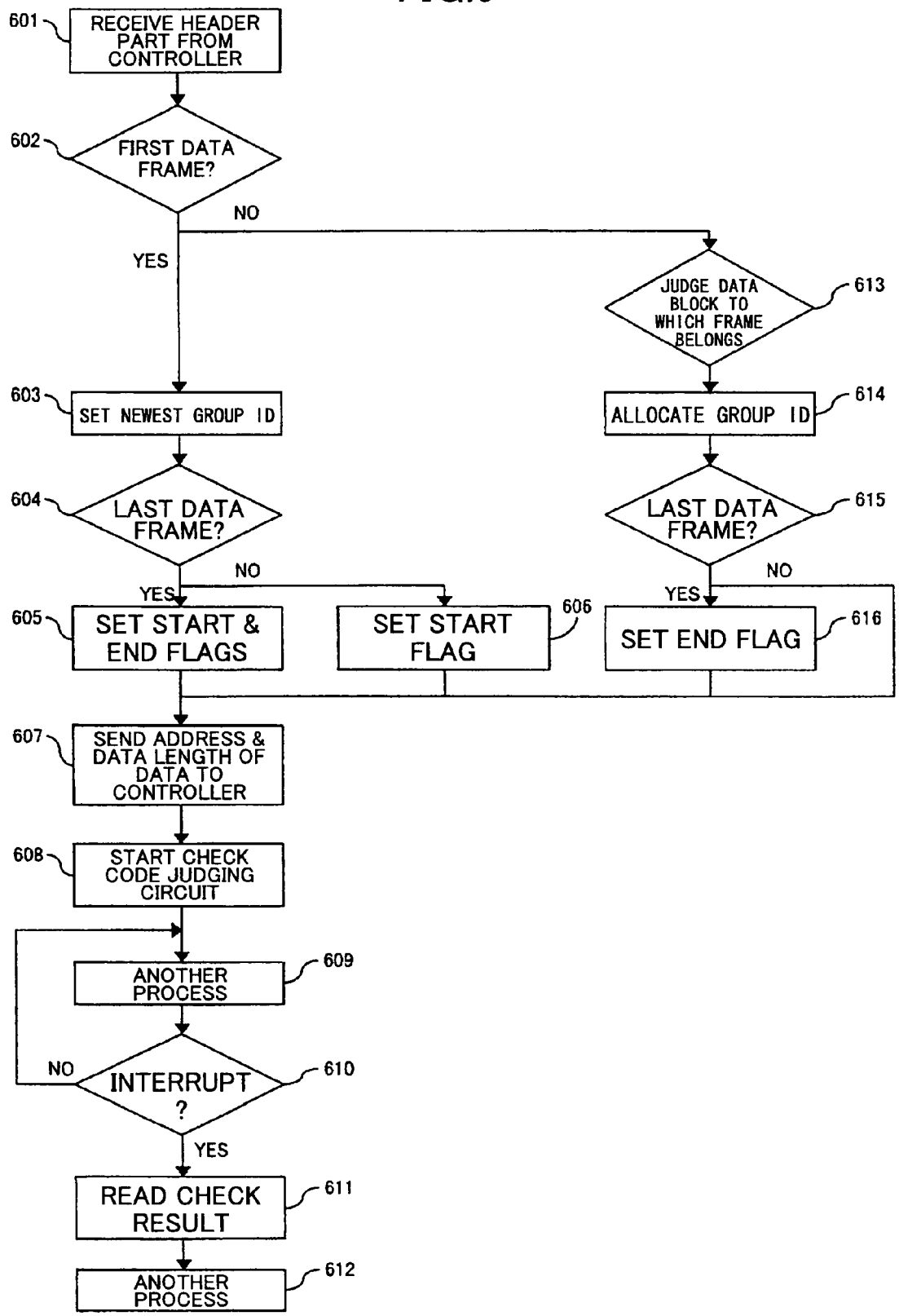
FIG. 9 is a flow chart for explaining a process of a processor.

FIG. 9 is a flow chart for explaining the process of the processor 202. The processor 202 stores the information of the header part received from the controller 203 in the memory 201, and interprets this information (step 601). Then, a judgement is made to determine whether or not the frame received from the host computer 111 is the first frame of the data block (step 602).

If the received frame is the first frame, a new group ID is allocated to the frame (step 603), and a judgement is made to determine whether or not the frame is the last frame of the data block (step 604). If the received frame is the last frame, the frame is the first and the last frame of the data block, and thus, the logic value "1" is set to the start flag and the end flag (step 605). On the other hand, if the received frame is not the last frame, the logic value "1" is set to the start flag and the logic value "0" is set to the end flag (step 606).

Next, the address and the data length of the data are set and are sent to the controller 203 together with the group ID, the start flag and the end flag (step 607), and further, the check code judging circuit 214 is started (step 608).

Another process is carried out until an interrupt signal is received from the controller 203 (steps 609 and 610). When the interrupt signal is received from the controller 203 (step 610), the check result is read from the check code judging circuit 214, the validity of the received data block is confirmed (step 611), and another process is carried out (step 612).

If the received frame is not the first frame in the step 602, the frame corresponds to the subsequent data of one of the frames that have already been received. Hence, a judgement is made to determine the data block to which the received frame belongs (step 613), and a group ID that is the same as that of the corresponding received frame is allocated to the received frame (step 614).

Next, a judgement is made to determine whether or not the frame is the last frame of the data block (step 615). If the received frame is the last frame, the logic value "0" is set to the start flag and the logic value "1" is set to the end flag (step 616). On the other hand, if the received frame is not the last frame, the logic value "0" is set to the start flag and the end flag. Thereafter, the process of the step 607 and the subsequent steps are carried out.

In order to manage the corresponding relationship between the data block and the group ID, a table holding the corresponding relationship between the identifier of each user data and each group ID is provided within the memory 201, for example. The processor 202 registers the data identifier and the group ID of the received frame in this table within the memory 201. In the step 614, the group ID corresponding to the data identifier of the newly received frame is acquired from the table, and is allocated to the newly received frame.

Figure 10:
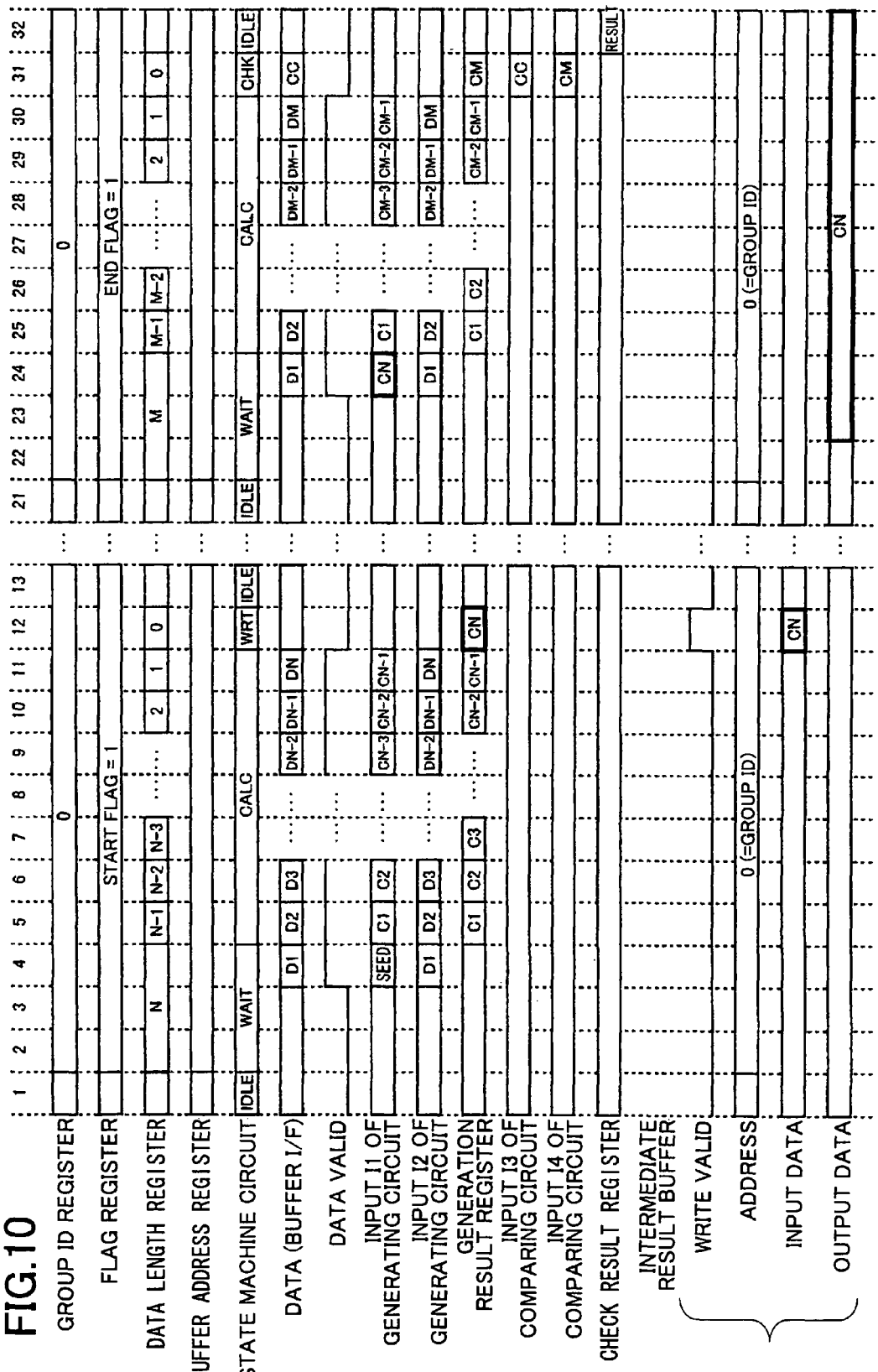
FIG. 10 is an operation timing chart of a check code judging circuit.

FIG. 10 is an operation timing chart of the check code judging circuit 214. In FIG. 10, the numbers shown at the top indicate the clock cycles. Cycles 1 through 13 represent the data processing with respect to the first frame of the data block, and cycles 21 through 32 represent the data processing with respect to the last frame of the data block. The state machine circuit 225 decrements the value of the data length register 224 by 1 for every 1 cycle when the computation of the check code starts.

The data valid signal is the control signal that is output from the data buffer 204 to the state machine circuit 225 and the check code comparing circuit 231 via the buffer interface 213. The write valid signal is the control signal that is output from the state machine circuit 225 to the intermediate result buffer 226. A description will now be given of the operation of the check code judging circuit 214, by referring to the cycle numbers shown in FIG. 10.

Cycle 1:

When the controller 203 receives the first frame, the processor 202 sets the group ID, the flags, the data length and the address, and starts the check code judging circuit 214. The group ID is set to 0, the start flag is set to the logic value "1", the end flag is set to the logic value "0", and the data length is set to N. Hence, the state machine circuit 225 makes a transition from the idle state IDLE to the wait state WAIT.

Cycle 4:

The first data "D1" is read from the data buffer 204 via the buffer interface 213, and is input to the port I2 of the check code generating circuit 229. In this state, since the start flag has the logic value "1", the multiplexer 227 selects the seed value and the state machine circuit 225 is in the wait state WAIT, and thus, the multiplexer 228 selects the output of the multiplexer 227. Accordingly, the seed value is input to the port I1 of the check code generating circuit 229. The state machine circuit 225 makes a transition from the wait state WAIT to the computation state CALC, and the value of the data length register 224 is decremented by 1.

Cycle 5:

The value "C1" that is obtained from the data input to the check code generating circuit 229 in the cycle 4 is stored in the generation result register 230. The second data "D2" is read from the data buffer 204, and is input to the port I2 of the check code generating circuit 229. In this state, since the state machine circuit 225 is the computation state CALC, the multiplexer 228 selects the output of the generation result register 230, and the value "C1" is input to the port I1 of the check code generating circuit 229. The value of the data length register 224 is decremented by 1.

Cycles 6 through 10:

Operations similar to that of the cycle 5 are repeated, and the value of the generation result register 230 is successively updated.

Cycle 11:

The value "CN−1" output from the check code generating circuit 229 is stored in the generation result register 230, and is input to the port I1 of the check code generating circuit 229. The data "DN" is read from the data buffer 204, and is input to the port I2 of the check code generating circuit 229. The value of the data length register 224 is 1, and becomes 0 when decremented by 1. Hence, the data "DN" is judged as being the last data. Because the end flag has the logic value "0" in this state, the state machine circuit 225 makes a transition from the computation state CALC to the write state WRT.

Cycle 12:

The value "CN" that is output from the check code generating circuit 229 is stored in the generation result register 230 as the computation result of the check code with respect to the first frame. The write valid signal is output from the state machine circuit 225, and the value "CN" in the generation result register 230 is stored in the intermediate result buffer 226 as the intermediate computation result. In this state, the value "CN" is written to the entry at the address "0" indicated by the group ID of the group ID register 221.

Thereafter, every time the controller 203 receives the next frame, the check code judging circuit 214 is started, and the value "CN" stored at the address "0" of the intermediate result buffer 226 is updated.

Cycle 21:

When the controller 203 receives the last frame, the processor 202 sets the group ID, the flags, the data length and the address, and starts the check code judging circuit 214. The group ID is set to "0", the start flag is set to the logic value "0", the end flag is set to the logic value "1", and the data length is set to M. Hence, the state machine circuit 225 makes a transition from the idle state IDLE to the wait state WAIT.

Cycle 24:

the first data "D1" is read from the data buffer 204, and is input to the port I2 of the check code generating circuit 229. Since the start flag has the logic value "0" in this state, the multiplexer 227 selects the output of the intermediate result buffer 226 and the state machine circuit 225 is in the wait state WAIT, and the multiplexer 228 selects the output of the multiplexer 227. Accordingly, the data "CN" at the address "0" of the intermediate result buffer 226 is input to the port I1 of the check code generating circuit 229. The state machine circuit 225 makes a transition from the wait state WAIT to the computation state CALC, and the value of the data length register 225 is decremented by 1.

Cycles 25 through 29:

Operations similar to that of the cycle 5 are repeated, and the value of the generation result register 230 is successively updated.

Cycle 30:

The value "CM−1" output from the check code generating circuit 229 is stored in the generation result register 230, and is input to the port I1 of the check code generating circuit 229. The data "DM" is read from the data buffer 204, and is input to the port I2 of the check code generating circuit 229. Since the value of the data length register 224 is 1, the data "DM" is judged as being the last data. Because the end flag has the logic value "1" in this state, the state machine circuit 225 makes a transition from the computation state CALC to the check state CHK.

Cycle 31:

The value "CM" that is output from the check code generating circuit 229 is stored in the generation result register 230 as the computation result of the check code with respect to the last frame. This value "CM" is the computation result of the check code with respect to the entire data having the group ID "0", and is input to the port I4 of the check code comparing circuit 231. In addition, the check code "CC" following the data of the last frame is read from the data buffer 204, and is input to the port I3 of the check code comparing circuit 231.

Cycle 32:

The check code comparing circuit 231 compares the computation result "CM" and the check code "CC" according to the control signal from the state machine circuit 225, and writes the result of the comparison to the check result register 232 as the check result.

Thereafter, the state machine circuit 225 sends the interrupt signal to the processor 202, and the processor 202 reads the check result from the check result register 232 to confirm the validity of the data block.

In FIG. 10, the frame forming 1 data block are consecutively transferred from the host computer 111, and only the data processing with respect to the first frame and the last frame of 1 data block is shown. However, the frame forming another data block may actually be interposed between these first and last frames. Even in such a case, by allocating a different group ID to the other data block and storing the computation result of the check code of the frame forming this other data block in another entry of the intermediate result buffer 226, it is possible to judge the check codes of a plurality of data blocks in parallel.

Figure 11:
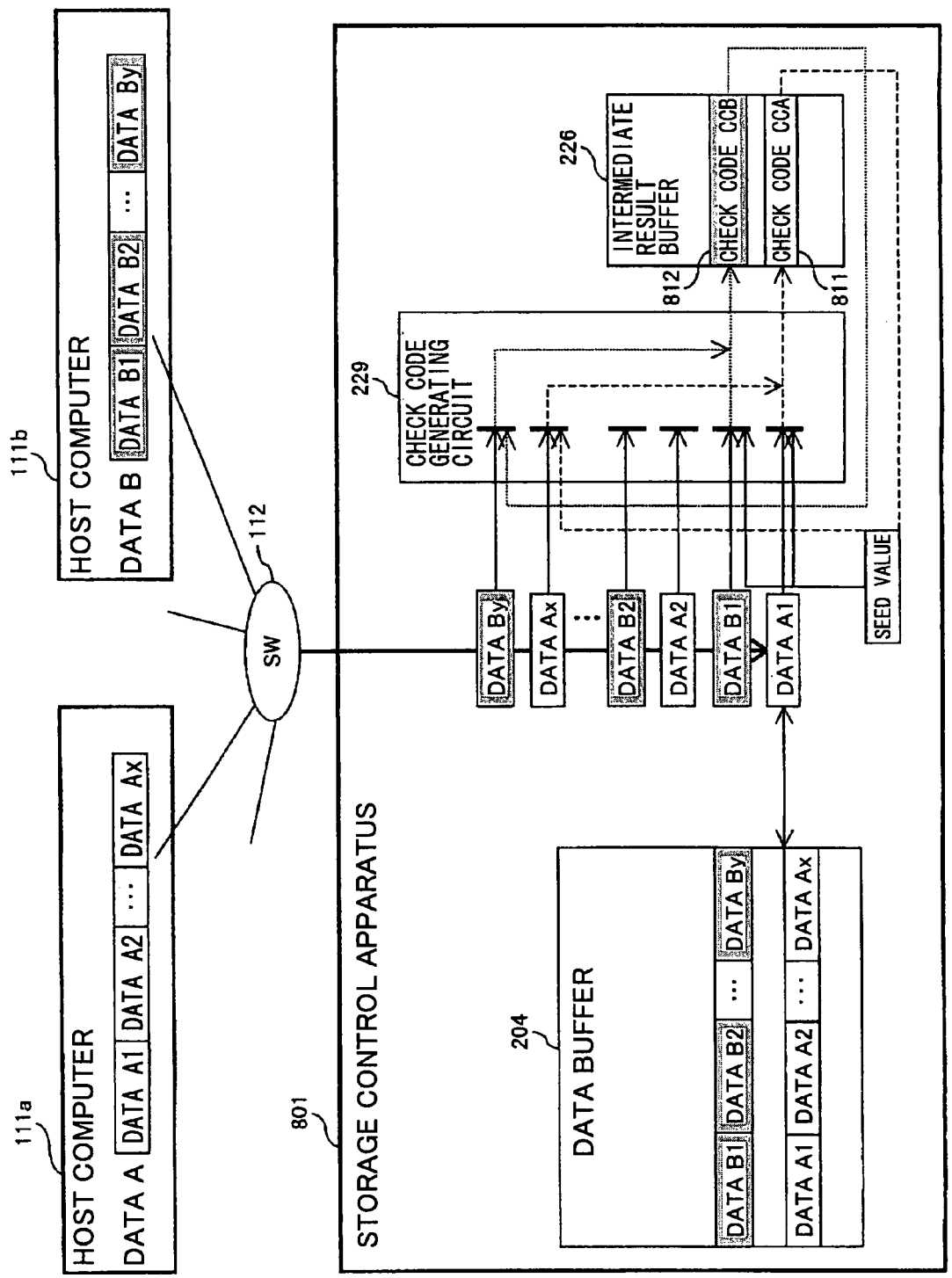
FIG. 11 is a diagram for explaining a check code judgement of a plurality of user data.

FIG. 11 is a diagram for explaining a check code judgement of a plurality of user data. In the particular case shown in FIG. 11, the user data A and B from corresponding host computers 111a and 111b are respectively disassembled into a plurality of frames and transferred to a storage control apparatus 801.

The user data A is made up of data A1, A2, ..., and Ax. The user data B is made up of data B1, B2, ..., and By. Each of the data A1, ... and B1, ... is accommodated within a different frame and transferred. The storage control apparatus 801 has a structure shown in FIG. 5, and receives the frames in the order of the data A1, B1, A2, B2, ..., Ax and By.

The data of the received frames are temporarily stored in the data buffer 204, and are successively read from the data buffer 204 by the check code judging circuit 214. The check code generating circuit 229 first computes a check code CCA from the data A1 and the seed value, and stores the check code CCA in a corresponding entry 811 of the intermediate result buffer 226 as the intermediate computation result. Next, the check code generating circuit 229 computes a check code CCB from the data B1 and the seed value, and stores the check code CCB in a corresponding entry 812 of the intermediate result buffer 226 as the intermediate computation result.

The check code generating circuit 229 then computes the check code from the data A2 and the check code CCA in the entry 811, and updates the check code CCA in the entry 811. In addition, the check code generating circuit 229 computes the check code from the data B2 and the check code CCB in the entry B, and updates the check code CCB in the entry 812.

Such an updating operation is repeated, and when the data Ax is input to the check code generating circuit 229, the check code with respect to the entire user data A is output to the check code comparing circuit 231. In addition, when the data By is input to the check code generating circuit 229, the check code with respect to the entire user data B is output to the check code comparing circuit 231.

Figure 12:
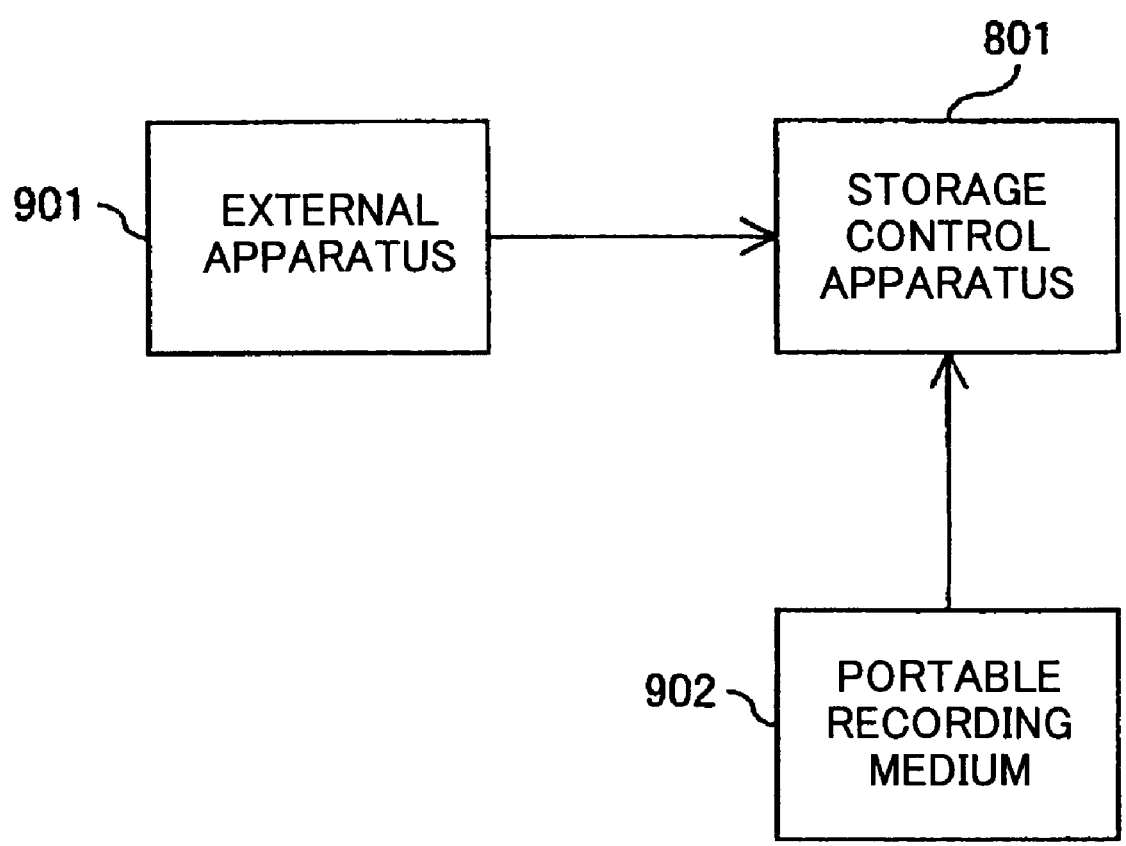
FIG. 12 is a diagram for explaining a method of providing programs and data.

FIG. 12 is a diagram for explaining a method of providing programs and data used by the processor 202. The program and data stored in a portable recording medium 902 or an external apparatus 901 of the information processing apparatus and the like are loaded into the memory 201 of the storage control apparatus 901. The external apparatus 901 generates a carrier signal for carrying the program and data, and sends the carrier signal to the storage control apparatus 801 via an arbitrary transmission medium on the communication network. The portable recording medium 902 is formed by an arbitrary computer-readable recording medium such as semiconductor memory devices including memory cards, flexible disks, optical disks and magneto-optical disks. The processor 202 executes the program using the data, and carries out the necessary processing.

According to this first embodiment described above, even when a plurality of user data that are disassembled into frames are received in a mixed state, the check code judgement with respect to the plurality of user data can be made in parallel every time the frame is received, and as a result, it is possible to reduce the time required to make the check code judgement. The processor 202 starts the check code judging circuit 214 of the controller 203 every time 1 frame is received, so as to judge the check code. In this case, the address of the data, the data length, the group ID and the flags indicating the start and the end of the user data are sent to the check code judging circuit 214. The data information for which the check code is to be computed is accumulated in the check code judging circuit 214, and when the check code computation for 1 frame ends, the oldest data information of the accumulated data information is obtained and used for the check code computation of the next frame. By accumulating the data information in this manner, it is possible to efficiently judge the check code when the number of frames from the host computer 111 increases at a certain time or increases locally.

If an error is generated in the controller 203 while computing the check code of the frame having a certain group ID (for example, when a read error from the data buffer 204 is generated), it is thereafter unnecessary to compute and judge the check code for the frame having this group ID. However, the data information of the following frames having the same group ID may already be accumulated within the check code judging circuit 214. In such a case, the processor 202 needs to discard the data information accumulated within the check code judging circuit 214, and to newly send to the check code judging circuit 214 the data information of the frame other than the frame having the certain group ID for which the error was generated. For this reason, it requires time to carry out the check code judgement with respect to the user data having the group ID unrelated to the error, and the host computer 11 may generate delays or stagnations.

Second Embodiment

Figure 13:
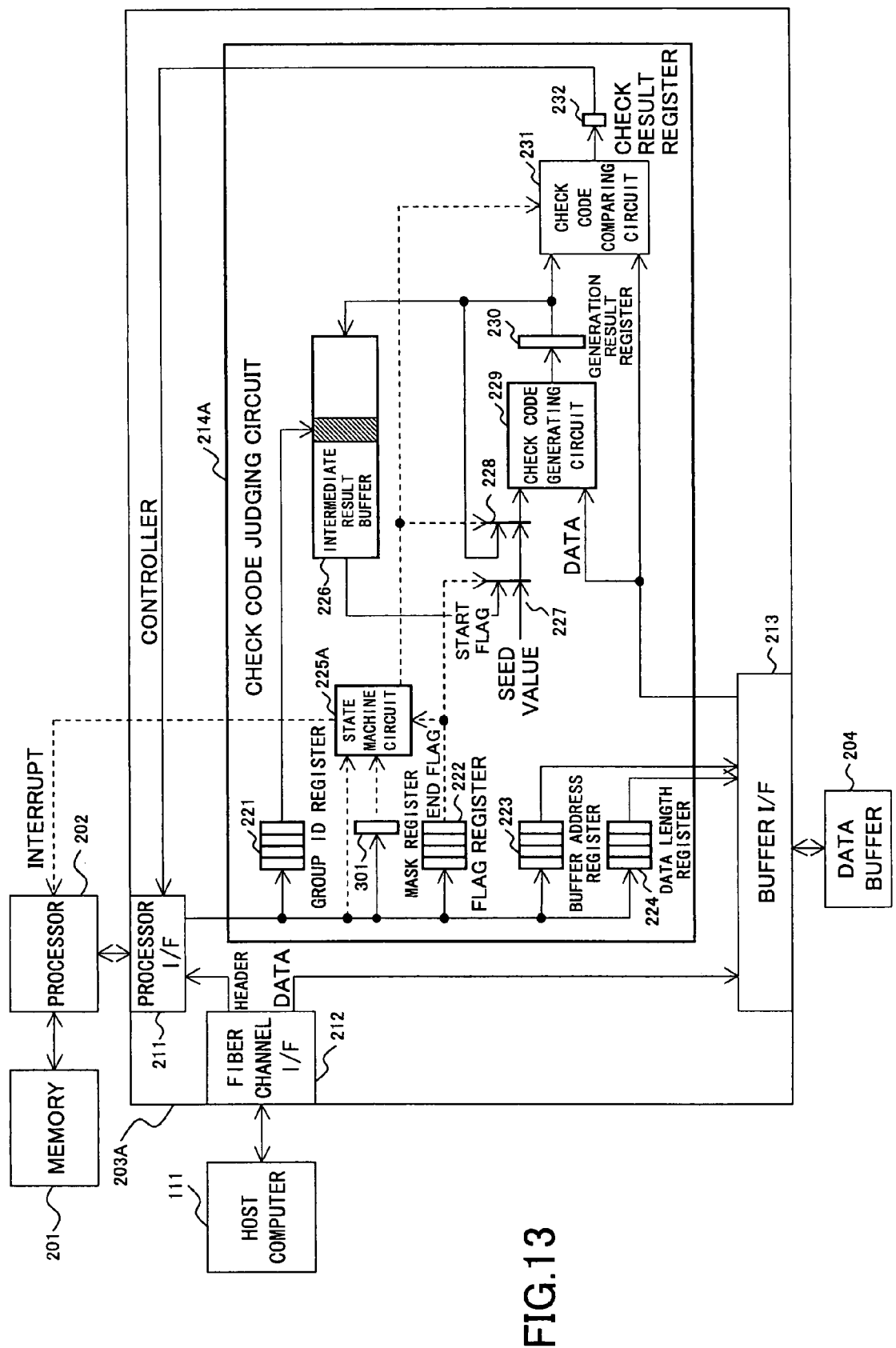
FIG. 13 is a diagram showing a structure of a second embodiment of the storage control apparatus according to the present invention.

FIG. 13 is a diagram showing a structure of a second embodiment of the storage control apparatus according to the present invention. In FIG. 13, those parts that are substantially the same as those corresponding parts in FIG. 5 are designated by the same reference numerals, and a description thereof will be omitted.

As shown in FIG. 13, a mask register 301 is provided within a check code judging circuit 214A. This mask register 301 has a bit corresponding 1:1 to the group identifier (group ID), and can instruct the processing of the data having the group ID corresponding to this bit to be skipped. When the processor 202 detects an error in the data having a specific group ID prior to making the check code comparison in the check code comparing circuit 231, the processor 202 sets a value "1" to the bit of the mask register 301, that instructs the processing of the data having the specific group ID corresponding to the content of the group ID register 221. Hence, it is possible to skip the processing of the data which is judged within a controller 203A as having the error for some reason before the end of the user data. The error of the data that is detected in this case includes an error within the controller 203A, a parity error (or ECC error) in the buffer interface 213 that provides the interface between the controller 203A and the data buffer 204, and the like. Accordingly, the computation and judgement with respect to the check code of only the data having the specific group ID are skipped. When the processing of the data is skipped, no data is read from the data buffer 204, and there is no need to change the information within the data buffer 204 and the data information already accumulated in the check code judging circuit 214A. Consequently, it is possible to quickly resume the processing of the data having other group IDs when the error is detected within the controller 203A.

Therefore, when the error is detected within the controller 203A, the processor 202 sets in the mask register 301 the information that instructs the processing of the data having the specific group ID corresponding to the error to be skipped, so that it is possible to skip the computation and judgement with respect to the check code of only the data having the specific group ID.

Figure 14:
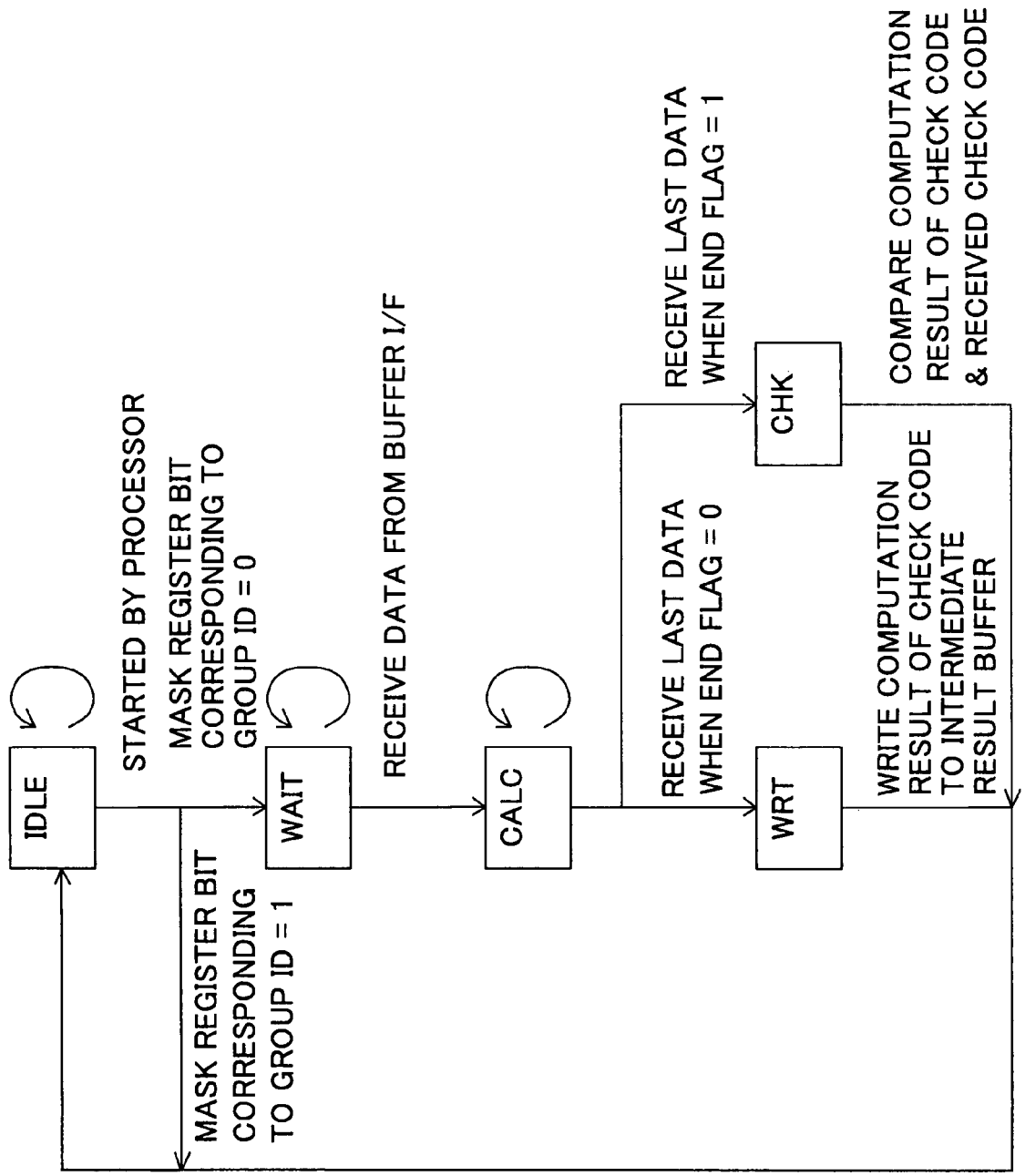
FIG. 14 is a diagram showing state transitions of a state machine circuit.

FIG. 14 is a diagram showing state transitions of a state machine circuit 225A within the check code judging circuit 214A shown in FIG. 13. In FIG. 14, those parts that are the same as those corresponding parts in FIG. 8 are designated by the same reference numerals, and a description thereof will be omitted.

When the state machine circuit 225A is started by the processor 202 and the bit of the mask register 301 corresponding to the group ID is "0", the state machine circuit 225A makes a transition from the idle state IDLE to the wait state WAIT. When the check code generating circuit 214A receives the data from the buffer interface 213, the state machine circuit 225A makes a transition from the wait state WAIT to the computation state CALC, and starts the necessary control for the computation of the check code. On the other hand, even when the state machine circuit 225A is started, the state machine circuit 225A remains in the idle state IDLE and does not make a transition to the wait state WAIT if the bit of the mask register corresponding to the group ID is "1".

According to this embodiment, even when an error is detected, it is possible to quickly resume the processing of the data unrelated to the error. As a result, it is possible to suppress delays or stagnations in the host computer 111.

Figure 2:
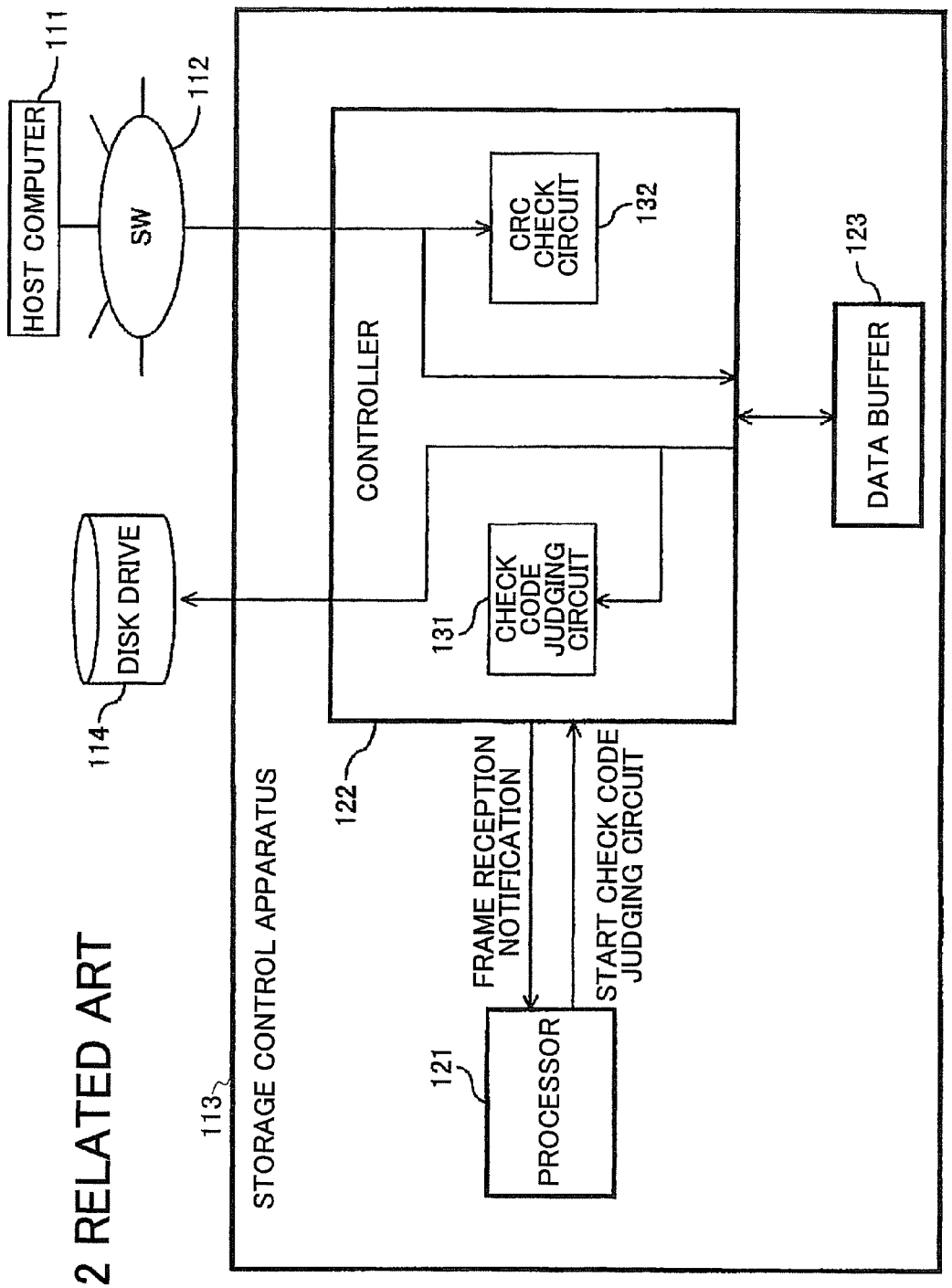
FIG. 2 is a diagram showing a structure of a data processing system.
Figure 3:
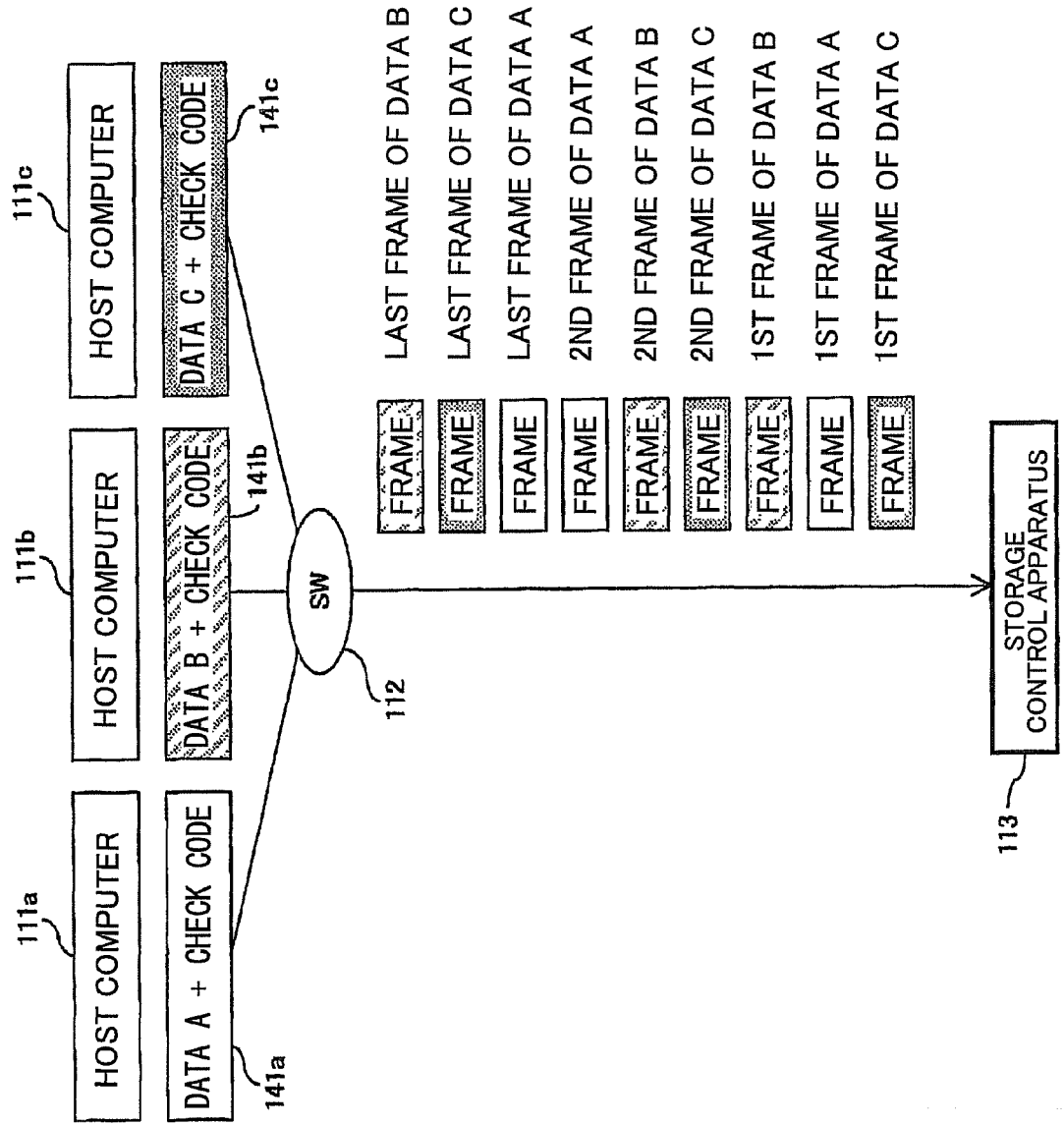
FIG. 3 is a diagram for explaining a data transfer from a plurality of host computers.

FIG. 15 is a diagram showing a structure of a data processing system employing the first or second embodiment described above. In FIG. 15, those parts that are substantially the same as those corresponding parts in FIG. 2 are designated by the same reference numerals, and a description thereof will be omitted. The data processing system shown in FIG. 15, includes one or a plurality of host computers 111, a communication network 112, a storage control apparatus 313, and one or a plurality of disk drives 114. For example, the disk drive 114 may have a Redundant Arrays of Independent Disks (RAID) structure.

The host computer 111 is connected to the storage control apparatus 313 via the communication network 112, and the disk drive 114 is connected to the storage control apparatus 313. The storage control apparatus 313 and the disk drive 114 form a storage apparatus. For example, the communication network 212 corresponds to a fiber channel link, and includes a switch. Generally, a plurality of host computers 111 are connected to the communication network 112. The storage control apparatus 313 includes a memory 201, a processor 202, a controller 203 (or 203A), and a data buffer 204. The controller 203 (or 203A) includes a check code judging circuit 214 (or 214A) and a CRC check circuit 132. The storage control apparatus 313 includes interfaces (not shown) with respect to the host computer 111 and the disk drive 114, and receives the data from the host computer 111 via the communication network 112.

Figure 1:
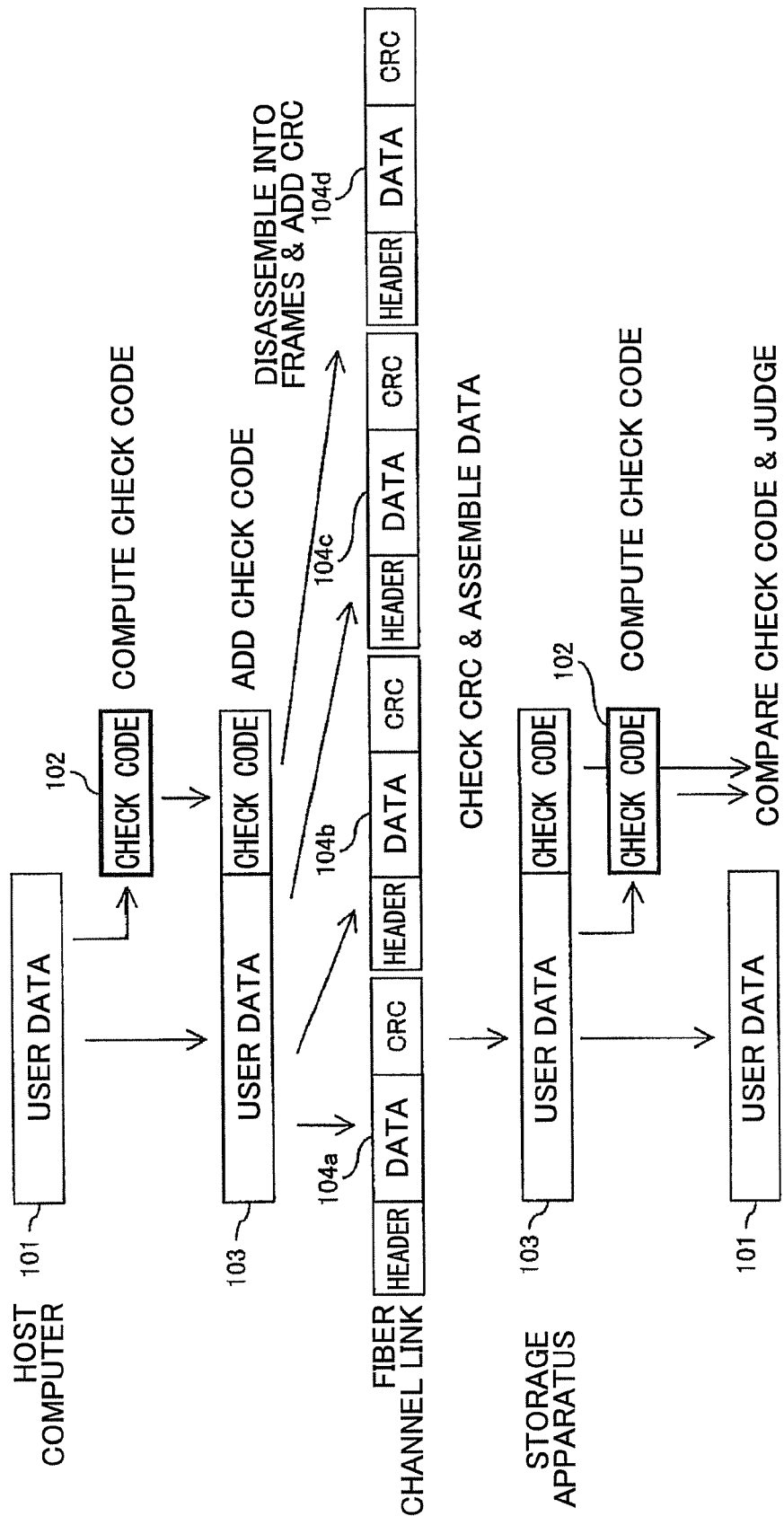
FIG. 1 is a diagram for explaining the data protection by the check code.

As shown in FIG. 1, the fiber channel frame includes the header part, the data part and the CRC code. When the controller 203 (or 203A) receives the frame, the CRC check circuit 132 first confirms whether or not an error exists in the received frame. At the same as this confirmation of the error in the received frame, the data part of the received frame is stored in the data buffer 204, and the header part is delivered to the processor 202. The header part of the received frame includes the information that is necessary to know the data block to which the frame belongs and to assemble the original data.

In the storage control apparatus 313, every time the frame is received from the host computer 111 and stored in the data buffer 204, the processor 202 starts the check code judging circuit 214 (or 214A). The check code judging circuit 214 (or 214A) judges the validity of the check code that is generated with respect to the data that is read from the data buffer 204, and notifies the judgement result to the processor 202, as described above in conjunction with the first embodiment.

In each of the embodiments described above, it is assumed that the disk drive is connected to the storage control apparatus. However, the present invention is of course applicable to a storage control apparatus that is connected to other storage units such as a tape unit. In addition, the disk drive may be a magnetic disk drive, an optical disk drive, a magneto-optical disk drive or the like.

The functions of the controller 203 described above may also be realized by a computer that forms the check code judging circuit 214 by executing a predetermined program by this computer. The program may be provided in a form recorded on a computer-readable recording medium such as a flexible disk, a CD-ROM, a CD-R, a CD-RW and a DVD. In other words, the present invention also includes a program which causes a computer to operate as an apparatus which judges the validity of the transfer data using the check code as in each of the embodiments described above, a storage apparatus or a storage control apparatus, and a computer-readable recording medium which stores such a program.

Therefore, the present invention is applicable to storage control apparatuses and the like having a check code judging function.

Further, the present invention is not limited to these embodiments, but various variations and modifications may be made without departing from the scope of the present invention.

What is claimed is:

1. A judging apparatus for judging a validity of data included in each data block using a check code included in each data block, when a plurality of data blocks that are respectively disassembled into a plurality of frames are received by the judging apparatus, said judging apparatus comprising:
a group identifier storing part configured to store a group identifier of a data block corresponding to a received frame, from among a plurality of group identifiers allocated to the plurality of data blocks;
an intermediate result storing part having a plurality of entries respectively configured to store an intermediate computation result of a check code of the plurality of data blocks for each of the group identifiers;
a generating part configured to generate an intermediate computation result of the check code using the data included in the received frame and the intermediate computation result stored in one of the entries of the intermediate result storing part corresponding to the group identifier stored in the group identifier storing part, and to update the intermediate computation result stored in said one of the entries;
a comparing part configured to compare a final computation result and the check code of one data block when the generating part generates the final computation result of the check code of the one data block using the data of a last frame of the one data block, and to output a comparison result; and
a mask storing part configured to store information that instructs a processing of data having a specific group identifier to be skipped when an error of the data having the specific group identifier is detected before the comparing of the check code by the comparing part,
wherein the information stored in the mask storing part instructs a computation of the check code of the data having the specific group identifier to be skipped.

2. The judging apparatus as claimed in claim 1, wherein the generating part updates the intermediate computation result of the plurality of entries of the intermediate result storing part in parallel, while repeating an operation of updating the intermediate computation result stored in a corresponding one of the entries of the intermediate result storing part every time one frame is received.

3. The judging apparatus as claimed in claim 1, further comprising:
a flag storing part configured to store a flag that indicates whether or not the received frame is a last frame of one data block,
wherein the generating part updates the intermediate computation result stored in said one of the entries of the intermediate result storing part when the flag does not indicate the last frame, and the comparing part compares the final computation result and the check code of the one data block when the flag indicates the last frame.

4. A storage control apparatus for judging a validity of data included in each data block using a check code included in each data block, when a plurality of data blocks that are respectively disassembled into a plurality of frames are received by the storage control apparatus, said storage control apparatus comprising:
a data buffer part configured to store a received frame;
a processor configured to allocate different group identifiers to each of the plurality of data blocks, to interpret information in a header part of the received frame, and to allocate a group identifier of the data block corresponding to the received frame to the received frame;
a group identifier storing part configured to store the group identifier allocated to the received frame;
an intermediate result storing part having a plurality of entries respectively configured to store an intermediate computation result of a check code of the plurality of data blocks for each of the group identifiers;
a generating part configured to generate an intermediate computation result of the check code using the data included in the received frame and the intermediate computation result stored in one of the entries of the intermediate result storing part corresponding to the group identifier stored in the group identifier storing part, and to update the intermediate computation result stored in said one of the entries;

a comparing part configured to compare a final computation result and the check code of one data block when the generating part generates the final computation result of the check code of the one data block using the data of a last frame of the one data block, and to output a comparison result;

a judging part configured to make a judgement to judge an error in the data having a specific group identifier from the comparison result; and a mask storing part configured to store information that instructs a processing of data having the specific group identifier to be skipped when the error of the data having the specific group identifier is detected before the comparing of the check code by the comparing part, wherein the information stored in the mask storing part instructs a computation of the check code of the data having the specific group identifier and the judgement of the error by the judging part to be skipped.

5. A storage apparatus for judging a validity of data included in each data block using a check code included in each data block and storing the data, when a plurality of data blocks that are respectively disassembled into a plurality of frames are received by the storage apparatus from a plurality of access apparatuses, said storage apparatus comprising:

a data buffer part configured to store a received frame;

a processor configured to allocate different group identifiers to each of the plurality of data blocks, to interpret information in a header part of the received frame, and to allocate a group identifier of the data block corresponding to the received frame to the received frame;

a group identifier storing part configured to store the group identifier allocated to the received frame;

an intermediate result storing part having a plurality of entries respectively configured to store an intermediate computation result of a check code of the plurality of data blocks for each of the group identifiers;

a generating part configured to generate an intermediate computation result of the check code using the data included in the received frame and the intermediate computation result stored in one of the entries of the intermediate result storing part corresponding to the group identifier stored in the group identifier storing part, and to update the intermediate computation result stored in said one of the entries;

a comparing part configured to compare a final computation result and the check code of one data block when the generating part generates the final computation result of the check code of the one data block using the data of a last frame of the one data block, and to output a comparison result;

a judging part configured to make a judgement to judge an error in the data having a specific group identifier from the comparison result;

a mask storing part configured to store information that instructs a processing of data having the specific group identifier to be skipped when the error of the data having the specific group identifier is detected before the comparing of the check code by the comparing part; and a storage unit shared by the plurality of access apparatuses, and configured to store an original data assembled from the data included in the plurality of frames of each data block, wherein the information stored in the mask storing part instructs a computation of the check code of the data having the specific group identifier and the judgement of the error by the judging part to be skipped.

6. A computer-readable storage medium that stores a program which, when executed by a computer, causes the computer to judge a validity of data included in each data block using a check code included in each data block, when a plurality of data blocks that are respectively disassembled into a plurality of frames are received by the computer, said program comprising:

a procedure causing the computer to store a header part of a received frame in a data buffer part, to interpret information in the header part, and to judge whether or not the received frame is a first frame of one data block;

a procedure causing the computer to allocate a new group identifier to the received frame if the received frame is the first frame, and to allocate a group identifier that is the same as that of a frame which has already been received and belongs to the same data block as the received frame if the received frame is not the first frame;

a procedure causing the computer to perform a computation to compute a check code of each data block while holding an intermediate computation result of the check code of the plurality of data blocks for each of the group identifiers, and to transfer the allocated group identifier to a judging unit which compares the computed check code and a check code of a data block corresponding to the received frame;

a procedure causing the computer to perform a confirmation to confirm the validity of each data block based on a comparison result of the check code transferred from the judging unit;

a procedure causing the computer to set, to the judging unit, information that instructs a processing of data having a specific group identifier to be skipped when an error of the data having the specific group identifier is detected before the judging unit compares the check codes; and a procedure causing the computer to skip the computation of the check code and the confirmation of the validity of the data having the specific group identifier.

* * * * *